United States Patent
Jung et al.

(10) Patent No.: US 9,714,113 B2
(45) Date of Patent: Jul. 25, 2017

(54) REUSABLE PACKAGING BOX

(71) Applicant: SAMSUNG ELECTRONICS CO., LTD., Suwon (KR)

(72) Inventors: Byung Min Jung, Uiwang (KR); Hyeung Wook Park, Hwaseong (KR); Jong Deok Lim, Suwon (KR); Yong Seok Choi, Suwon (KR); Ah-Young Kim, Seongnam-si (KR); Choul Jun Hwang, Uiwang-si (KR)

(73) Assignee: SAMSUNG ELECTRONICS CO., Ltd., Suwon-si (KR)

( * ) Notice: Subject to any disclaimer, the term of this patent is extended or adjusted under 35 U.S.C. 154(b) by 80 days.

(21) Appl. No.: 13/868,488

(22) Filed: Apr. 23, 2013

(65) Prior Publication Data
US 2013/0277263 A1 Oct. 24, 2013

(30) Foreign Application Priority Data

Apr. 23, 2012 (KR) .................. 10-2012-0041956
Aug. 31, 2012 (KR) .................. 10-2012-0096576
Mar. 12, 2013 (KR) .................. 10-2013-0026040

(51) Int. Cl.
*B65D 6/16* (2006.01)
*B65D 19/02* (2006.01)
(Continued)

(52) U.S. Cl.
CPC .......... *B65D 15/00* (2013.01); *B65D 11/1853* (2013.01); *B65D 71/04* (2013.01);
(Continued)

(58) Field of Classification Search
CPC ..... B60P 7/0869; B61D 45/008; B65D 71/04; B65D 2519/00174; B65D 2519/00925;
(Continued)

(56) References Cited

U.S. PATENT DOCUMENTS 749,834 A * 1/1904 Beisel ............................ 217/69
1,198,524 A * 9/1916 Cunliffe ................... B65D 7/26
119/499
(Continued)

FOREIGN PATENT DOCUMENTS

DE 7527514 U 12/1975
DE 4143023 C1 5/1993
(Continued)

OTHER PUBLICATIONS

Extended European Search Report issued Jul. 19, 2013 in corresponding European Application No. 13163016.2.
(Continued)

*Primary Examiner* — Gideon Weinerth
(74) *Attorney, Agent, or Firm* — Staas & Halsey LLP

(57) ABSTRACT

The reusable packaging box includes a bottom unit that has a receiving space in which a product may be received, a lower body and an upper body that are provided to each have a box shape with open top and bottom to be coupled to a top of the bottom unit, and a lid that has a receiving space in which the product may be received and is coupled to the top of the upper body. Each of the bottom unit, the upper body and the lower body, and the lid is formed of a material that may absorb an impact and thus may perform both a function of absorbing an impact and a function of packaging an outside of the product.

18 Claims, 22 Drawing Sheets

(51) Int. Cl.
| | |
|---|---|
| *B65D 27/00* | (2006.01) |
| *B65D 8/00* | (2006.01) |
| *B65D 6/18* | (2006.01) |
| *B65D 71/04* | (2006.01) |
| *B65D 81/02* | (2006.01) |
| *B65D 81/03* | (2006.01) |

(52) U.S. Cl.
CPC ........... *B65D 81/022* (2013.01); *B65D 81/03* (2013.01); *B65D 2203/06* (2013.01); *B65D 2313/02* (2013.01); *B65D 2519/00905* (2013.01); *B65D 2519/00915* (2013.01); *B65D 2519/00935* (2013.01); *B65D 2585/6812* (2013.01); *B65D 2585/6817* (2013.01); *B65D 2585/6837* (2013.01); *B65D 2585/6855* (2013.01); *Y02W 30/807* (2015.05)

(58) Field of Classification Search
CPC ........... B65D 2519/00621; B65D 2519/00651; B65D 2519/00905; B65D 2519/00502; B65D 19/06; B65D 19/18; B65D 1/225
USPC ....... 206/320, 453, 586, 597, 600, 508, 503, 206/511, 517; 410/156; 24/298–302
See application file for complete search history.

(56) References Cited

U.S. PATENT DOCUMENTS

| | | | | | |
|---|---|---|---|---|---|
| 1,673,769 | A | * | 6/1928 | Graham | G07C 13/02 220/6 |
| 2,665,047 | A | * | 1/1954 | Belsinger | 229/125.21 |
| 2,775,393 | A | * | 12/1956 | Melvin | 229/117.02 |
| 3,073,439 | A | * | 1/1963 | Symmonds, Jr. | 206/453 |
| 3,107,023 | A | * | 10/1963 | Jacobson et al. | 217/15 |
| 3,152,693 | A | * | 10/1964 | Anderson | B65D 71/04 206/453 |
| 3,246,828 | A | * | 4/1966 | Branscum | B65D 1/225 220/4.34 |
| 4,011,632 | A | * | 3/1977 | MacDonald | 410/99 |
| 4,024,977 | A | * | 5/1977 | Rowley | 217/12 R |
| 4,591,065 | A | * | 5/1986 | Foy | B65D 11/1833 206/509 |
| 4,643,314 | A | * | 2/1987 | Kidd | B65D 19/06 206/386 |
| 4,673,087 | A | * | 6/1987 | Webb | 206/600 |
| 4,700,862 | A | * | 10/1987 | Carter et al. | 220/6 |
| 4,765,252 | A | * | 8/1988 | Shuert | B65D 15/22 108/55.1 |
| 4,834,254 | A | * | 5/1989 | Mead | B65D 19/12 217/43 A |
| 4,944,404 | A | * | 7/1990 | Mead | B65D 19/06 206/600 |
| 5,249,678 | A | * | 10/1993 | Traina | B65D 81/02 206/320 |
| 5,323,921 | A | * | 6/1994 | Olsson | 217/12 R |
| 5,361,923 | A | * | 11/1994 | Knight et al. | 220/6 |
| 5,564,599 | A | * | 10/1996 | Barber | B65D 77/061 206/600 |
| 5,584,623 | A | * | 12/1996 | Nadherny | B65D 71/04 410/155 |
| 5,601,232 | A | * | 2/1997 | Greenlee | B65D 19/20 206/600 |
| 5,765,707 | A | * | 6/1998 | Kenevan | 220/4.28 |
| 5,899,337 | A | * | 5/1999 | Thebeault | 206/600 |
| 5,934,474 | A | * | 8/1999 | Renninger | B65D 19/20 108/51.3 |
| 6,032,815 | A | * | 3/2000 | Elstone | B65D 25/38 206/600 |
| 6,050,410 | A | * | 4/2000 | Quirion | B65D 19/20 206/386 |
| 6,299,011 | B1 | * | 10/2001 | Rosenfeldt | 220/4.29 |
| D496,853 | S | * | 10/2004 | Jones | D8/394 |
| 7,290,664 | B2 | * | 11/2007 | Kono et al. | 206/600 |
| 7,484,623 | B2 | * | 2/2009 | Goodrich | 206/600 |
| 7,765,744 | B2 | * | 8/2010 | Herron | 52/79.5 |
| 8,181,806 | B2 | * | 5/2012 | Hidalgo Vargas | 220/4.34 |
| 8,209,916 | B2 | * | 7/2012 | Herron | 52/79.5 |
| 8,870,503 | B2 | * | 10/2014 | Stromberg | B60P 7/06 410/97 |
| 2003/0052158 | A1 | * | 3/2003 | Spindel | B65D 11/1853 229/122.21 |
| 2003/0106187 | A1 | * | 6/2003 | Jackson et al. | 24/298 |
| 2005/0108988 | A1 | * | 5/2005 | Dickner | 53/393 |
| 2006/0054620 | A1 | | 3/2006 | Liu et al. | |
| 2006/0237455 | A1 | * | 10/2006 | Vargas | 220/4.34 |
| 2006/0261061 | A1 | * | 11/2006 | Spindel | B65D 9/14 220/6 |
| 2007/0110536 | A1 | * | 5/2007 | Thomson et al. | 410/99 |
| 2007/0170085 | A1 | * | 7/2007 | Hoogland | B65D 19/18 206/600 |
| 2008/0000397 | A1 | * | 1/2008 | Dickinson | B65D 19/20 108/55.3 |
| 2008/0264825 | A1 | * | 10/2008 | Hagan III | B65D 19/0095 206/597 |
| 2011/0031258 | A1 | | 2/2011 | Wilks et al. | |
| 2011/0266177 | A1 | * | 11/2011 | Lowry et al. | 206/320 |
| 2013/0327669 | A1 | * | 12/2013 | Sueoka | B65D 19/0036 206/453 |
| 2014/0262925 | A1 | * | 9/2014 | Babinchak | B66C 1/122 206/586 |

FOREIGN PATENT DOCUMENTS

| | | |
|---|---|---|
| DE | 202010017246 U1 | 6/2011 |
| EP | 1860034 A1 | 11/2007 |
| FR | 2552253 A1 | 3/1985 |
| FR | 2805528 A1 | 8/2001 |
| GB | 2303620 A | 2/1997 |

OTHER PUBLICATIONS

European Patent Office Communication regarding Intention to Grant dated Apr. 26, 2016, from European Patent Application No. 13163016.2 (53 pages).

* cited by examiner

REUSABLE PACKAGING BOX

CROSS-REFERENCE TO RELATED APPLICATION

This application claims the benefit of Korean Patent Application No. 10-2012-0041956, filed on Apr. 23, 2012, Korean Patent Application No. 10-2012-0096576, filed on Aug. 31, 2012, Korean Patent Application No. 10-2013-0026040, filed on Mar. 12, 2013 in the Korean Intellectual Property Office, the disclosure of which is incorporated herein by reference.

BACKGROUND

1. Field

Embodiments of the present invention relate to a reusable packaging box whose interior and exterior are integrally formed with each other.

2. Description of the Related Art

In general, to a box that packages a large electronic product such as a refrigerator, a washing machine, an air conditioner, a large TV, or a network server, protectability, efficiency, volume, or cost is more important than esthetics. In particular, such a box is manufactured to be disposable due to its volume and weight.

A packaging box packages an outside of a product, and a buffering member for absorbing an impact on the product is separately provided in the packaging box to contact the product.

Since a packaging box is manufactured to be disposable and requires a separate buffering member, there is a limitation in reducing material costs.

Also, since a packaging box is discarded after used once, additional costs for handling waste are incurred and environmental contamination is caused.

SUMMARY

Therefore, it is an aspect of the present invention to provide a reusable packaging box whose interior and exterior are integrally formed with each other to perform both a function of absorbing an impact and a function of packaging an outside of a product.

It is another aspect of the present invention to provide a reusable packaging box that may be stored after used without being discarded and then may be reused.

Additional aspects of the invention will be set forth in part in the description which follows and, in part, will be obvious from the description, or may be learned by practice of the invention.

In accordance with one aspect of the present invention, a reusable packaging box includes: a bottom unit that has a receiving space in which a product is received; a lower body and an upper body that are provided to each have a box shape with open top and bottom to be coupled to a top of the bottom unit, include left and right plates each including two side plates coupled to a plurality of hinge members each having a double hinge structure such that the two side plates rotate in left and right directions, and include front and back plates hinge-coupled to the left and right plates such that the front and back plates rotate in the left and right directions, wherein the upper body and the lower body are stored after being folded in order to reuse the reusable packaging box; and a lid that has a receiving space in which the product is received and is coupled to the top of the upper body, wherein each of the bottom unit, the upper body and the lower body, and the lid is formed of a material that absorbs an impact and thus performs both a function of absorbing an impact and a function of packaging an outside of the product.

The bottom unit and the lid may be fixed using a strap along with the lower body and the upper body, and reinforcing members may be coupled to contact portions between the strap, and the bottom unit and the lid to prevent the contact portions from being deformed due to the strap.

Coupling units to which the reinforcing members are coupled may be provided on the bottom unit and the lid, and each may include an insertion hole into which an insertion unit of each of the reinforcing members is inserted and a flange unit into which an adhesive unit of each of the reinforcing members is inserted and coupled.

When the lower body and the upper body are stored after being folded in order to reuse the reusable packaging box, the lower body and the upper body may be laid down and stacked between the bottom unit and the lid, and are fixed using the strap.

The left and right plates may include a plurality of coupling grooves into which the plurality of hinge members are inserted and coupled, and the plurality of coupling grooves may be formed by a plurality of first connection units that protrude from each one side of the left and right plates.

A plurality of second connection units may protrude from the other sides of the left and right plates to be connected to the front and back plates, and a plurality of third connection units may protrude from the front and back plates to form a plurality of grooves into which the plurality of second connection units are inserted.

Two first hinge holes may be formed in each of the plurality of hinge members, second hinge holes may be formed in the plurality of first connection units to correspond to the two first hinge holes, and the left and right plates may be rotatably coupled to the plurality of hinge members using hinge shafts inserted into the first hinge holes and the second hinge holes.

Third hinge holes may be formed in the plurality of second connection units, fourth hinge holes may be formed in the plurality of third connection units to correspond to the third hinge holes, and the left and right plates may be rotatably coupled to the front and back plates using hinge shafts inserted into the third hinge holes and the fourth hinge holes.

An attachment groove may be formed in an outer surface of at least one of the bottom unit, the lower body, the upper body, and the lid, a barcode label on which essential information needed to package and transport the product received therein is recorded may be attached to the attachment groove, and a transparent pad may be attached to an outer surface of the barcode label to prevent the barcode label from being contaminated and damaged.

The lower body may include a lower body coupling unit including a first coupling unit that is provided in an upper portion and is coupled to the upper body and a second coupling unit that is provided in a lower portion and is coupled to the bottom unit, and the upper body may include an upper body coupling unit including a third coupling unit that is provided in an upper portion and is coupled to the lid and a fourth coupling unit that is provided in a lower portion and is coupled to the lower body.

The bottom unit may include a bottom coupling unit that is coupled to the second coupling unit of the lower body, and the lid may include a lid coupling unit that is coupled to the third coupling unit of the upper body.

The first coupling unit may be provided to protrude upward from the upper portion of the lower body, have a lower end with a thickness less than a thickness of the lower body, and extend such that a thickness decreases from the lower end upward to an outside of the lower body, and the fourth coupling unit may be provided to have a shape corresponding to the first coupling unit.

The second coupling unit may be provided to protrude downward from the lower portion of the lower body, have an upper end with a thickness less than a thickness of the lower body, and extend such that a thickness decreases downward from the upper end toward an outside of the lower body, and the bottom coupling unit may be provided to have a shape corresponding to the second coupling unit.

The third coupling unit may be provided to protrude upward from the upper portion of the upper body, have a lower end with a thickness less than a thickness of the upper body, and extend such that a thickness decreases upward from the lower end toward an outside of the upper body, and the lid coupling unit may be provided to have a shape corresponding to the third coupling unit.

The third coupling unit may be provided to protrude upward from the upper portion of the upper body, have a lower end with a thickness less than a thickness of the upper body, and extend such that a thickness decreases upward from the lower end toward an inside of the upper body, and the lid coupling unit may be provided to have a shape corresponding to the third coupling unit.

When a receiving groove is formed in a side of a top inner surface of the lid and a protrusion is formed upward from a side of a top of the product, the protrusion may be received in the receiving groove.

When a protrusion is formed upward from a side of a top of the product, an auxiliary board may be inserted between the lid and the product in order to fill a stepped space formed due to the protrusion.

Each of the bottom unit, the lower body, the upper body, and the lid may be formed of expanded polypropylene (EPP).

In accordance with another aspect of the present invention, a reusable packaging box includes: a bottom unit that has a receiving space in which a product is received; an air tube that is provided to have a box shape with open top and bottom, is coupled to a top of the bottom unit, and includes an air inlet and an air outlet formed in a lower end portion to repeatedly introduce or discharge air; and a lid that has a receiving space in which the product is received, and is coupled to the top of the air tube, wherein each of the bottom unit and the lid is formed of a material that absorbs an impact and thus performs both a function of absorbing an impact and a function of packaging an outside of the product along with the air tube.

The bottom unit and the lid may be fixed using a strap along with the air tube, and reinforcing members may be coupled to contact portions between the bottom unit and the lid, and the strap to prevent the contact portions from being deformed due to the strap.

Coupling units to which the reinforcing members are coupled may be provided on the bottom unit and the lid, and each may include an insertion hole into which an insertion unit of each of the reinforcing members is inserted and a flange unit into which an adhesive unit of each of the reinforcing members is inserted and coupled.

When air is discharged from the air tube for reuse, the air tube may be folded after the air is discharged, may be inserted between the bottom unit and the lid, and may be fixed using the strap.

The air tube may have four surfaces on which a plurality of air cells are provided, and the air inlet and the air outlet may be formed in each of the four surfaces.

The plurality of air cells provided on each of the four surfaces may be connected to one another by connection tubes, and when air is introduced through the air inlet, air may be introduced into all of the plurality of air cells provided on each of the four surfaces, and when air is discharged through the air outlet, air may be discharged from all of the plurality of air cells provided on each of the four surfaces.

Each of the plurality of air cells may include an inner tube, and an inner lining and an outer cladding which are provided outside the inner tube, the inner tube may be formed of two layers of thermoplastic polyurethane (TPU), and each of the inner lining and the outer cladding contacting the product may be formed of a nylon-based fabric.

An attachment groove may be provided in an outer surface of at least one of the bottom unit and the lid, a barcode label on which essential information needed to package and transport the product received therein is recorded may be attached to the attachment groove, and a transparent pad may be attached to an outer surface of the barcode label to prevent the barcode label from being contaminated and damaged.

When a receiving groove is formed in a side of a top inner surface of the lid, and when there is a protrusion protruding upward from a side of a top of the product, the protrusion may be received in the receiving groove.

When a protrusion is formed upward from a side of a top of the product, an auxiliary board may be inserted between the lid and the product in order to fill a stepped space formed due to the protrusion.

Each of the bottom unit and the lid may be formed of expanded polypropylene (EPP).

In accordance with another aspect of the present invention, a reusable packaging box includes: a bottom unit that has a receiving space in which a product is received; an air cell blanket that is provided to surround a portion of the product exposed to the outside of the bottom unit, and includes a plurality of air cell units formed therein to absorb an impact on the product; and a lid that is provided on a top of the air cell blanket to cover a top of the product, wherein each of the bottom unit and the lid is formed of a material that absorbs an impact and thus performs both a function of absorbing an impact and a function of packaging an outside of the product along with the air cell blanket.

Each of the bottom unit and the lid may be formed of expanded polypropylene (EPP).

The plurality of air cell units may include a plurality of air cells.

In accordance with another aspect of the present invention, a reusable packaging box includes: a bottom unit that has a receiving space in which a product is received; a fabric blanket that is provided to surround a portion of the product exposed to the outside of the bottom unit; velcros that are detachably adhered to edge portions of the product surrounded by the fabric blanket and absorb an impact on the product; and a lid that is provided on a top of the fabric blanket to receive a portion of the product exposed to the outside of the fabric blanket, wherein each of the bottom unit and the lid is formed of a material that absorbs an impact and thus performs both a function of absorbing an impact and a function of packaging an outside of the product along with the velcros.

Each of the bottom unit and the lid may be formed of expanded polypropylene (EPP).

In accordance with another aspect of the present invention, a reusable packaging box includes: a bottom unit that has a receiving space in which a product is received and a wheel provided in a bottom surface thereof; and a fabric blanket that is coupled to a top of the bottom unit, has a receiving space in which the product is received, and is opened and closed using a zipper, wherein the fabric blanket includes a height adjusting unit that adjusts a height to correspond to a size of the product, and the height adjusting unit is coupled to and separated from the fabric blanket using the zipper.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings.

Figure 1:
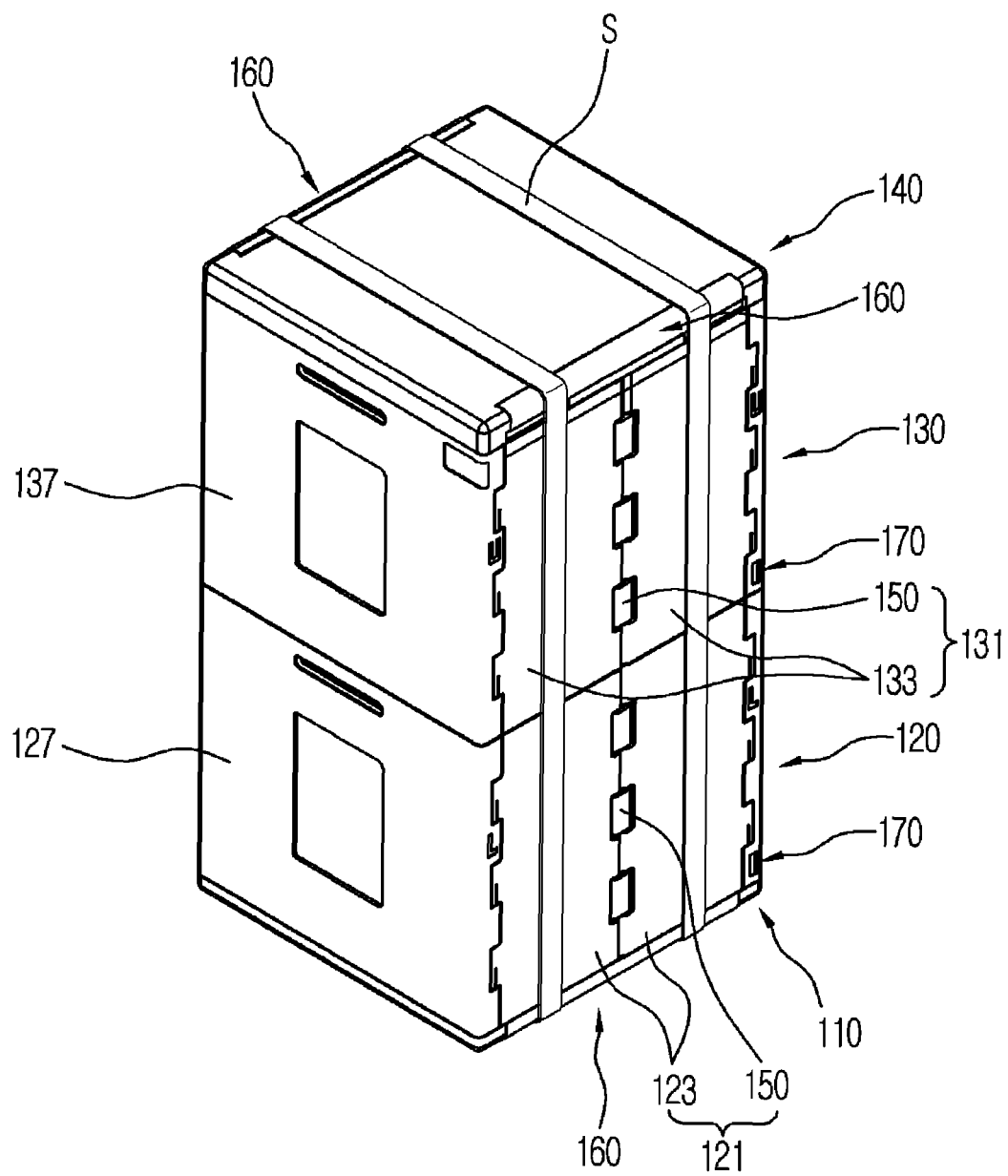
FIG. 1 is a perspective view illustrating a reusable packaging box according to an embodiment of the present invention.
Figure 2:
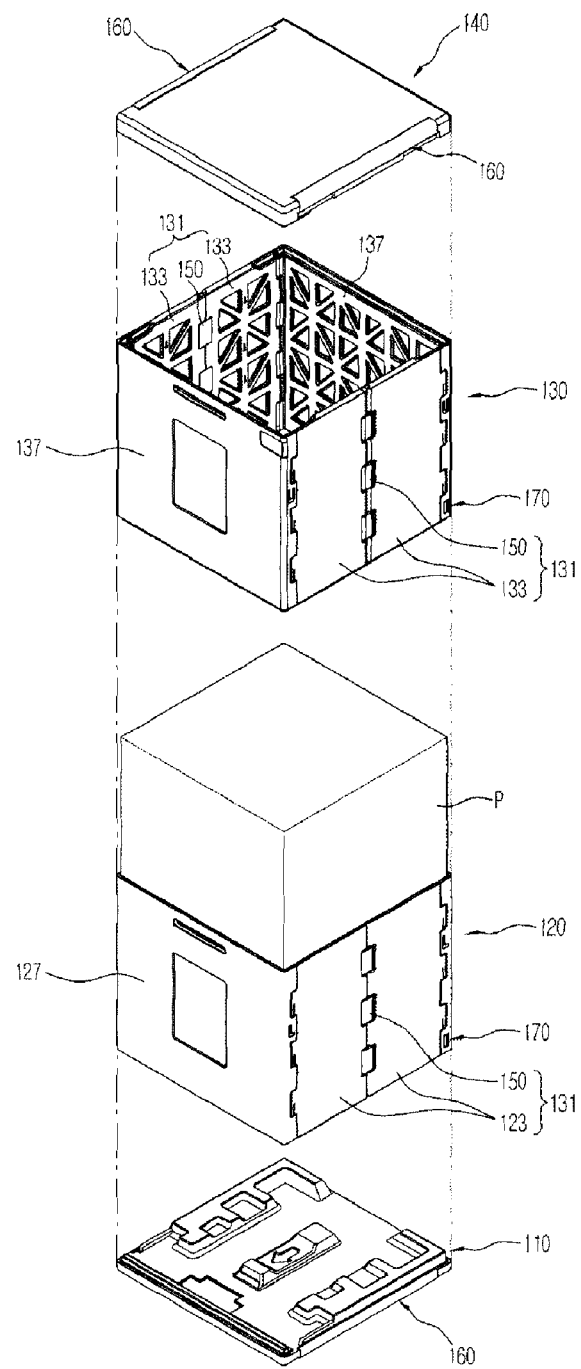
FIG. 2 is an exploded perspective view illustrating the reusable packaging box of FIG. 1.
Figure 3:
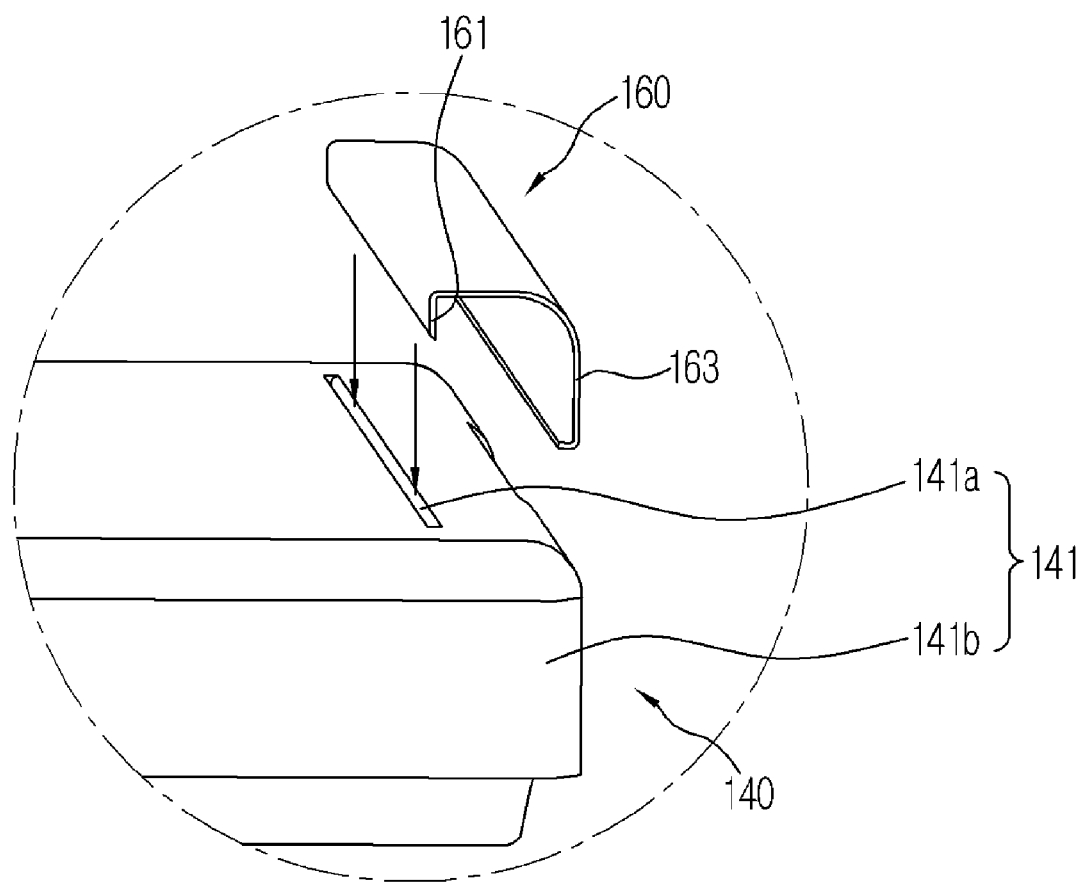
FIGS. 3 and 4 are perspective views illustrating a state where a reinforcing member is coupled to a lid, according to an embodiment of the present invention.
Figure 4:
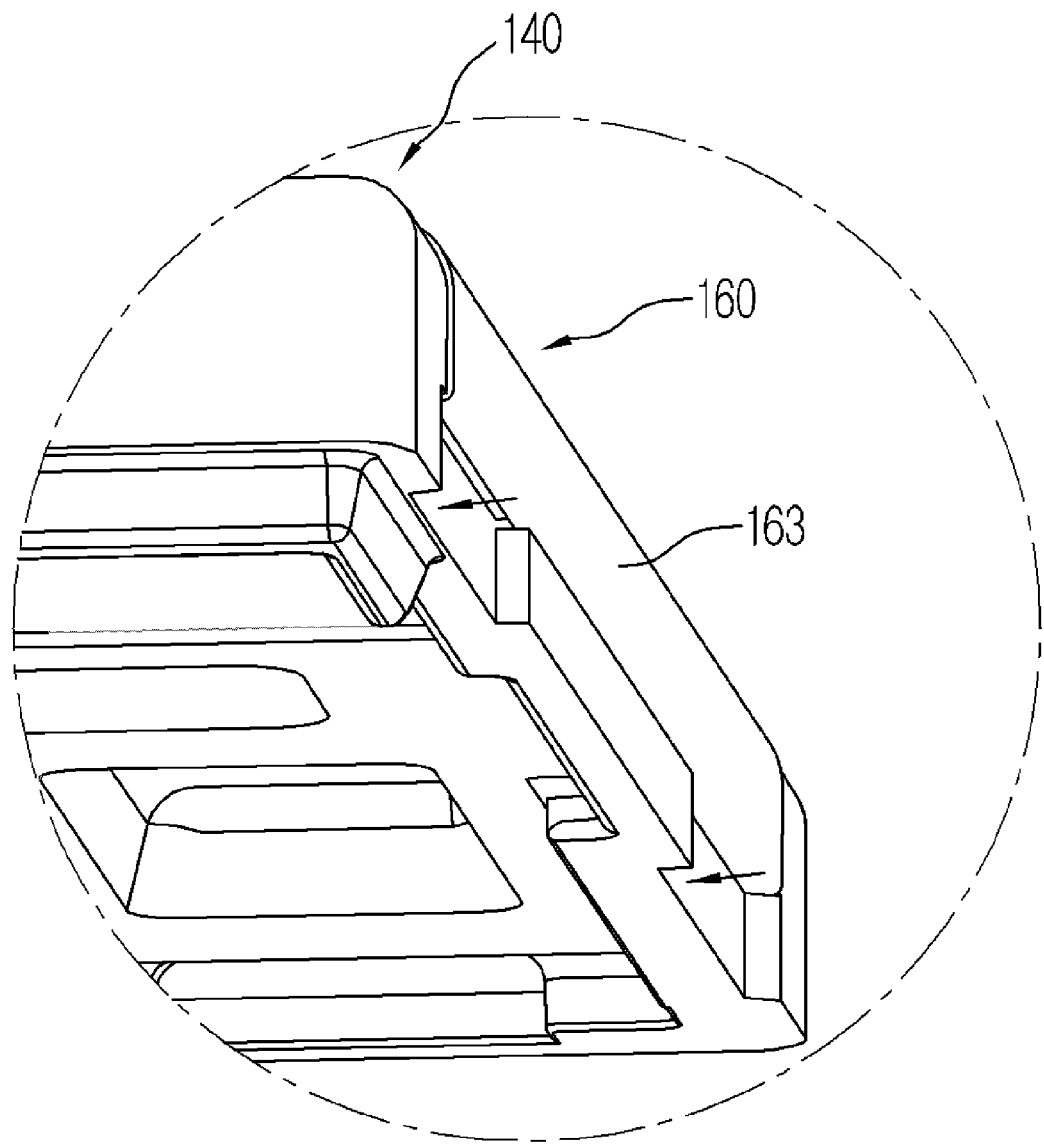
Figure 5:
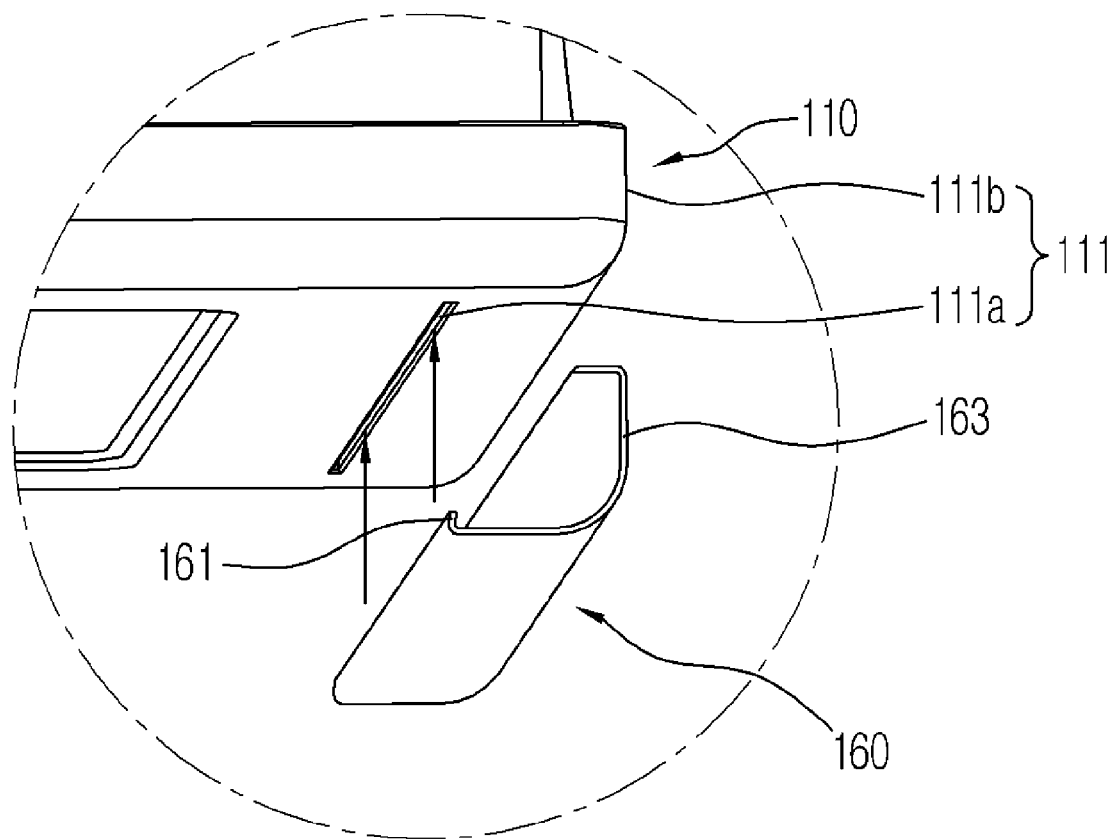
FIGS. 5 and 6 are perspective views illustrating a state where the reinforcing member is coupled to a bottom unit, according to an embodiment of the present invention.
Figure 6:
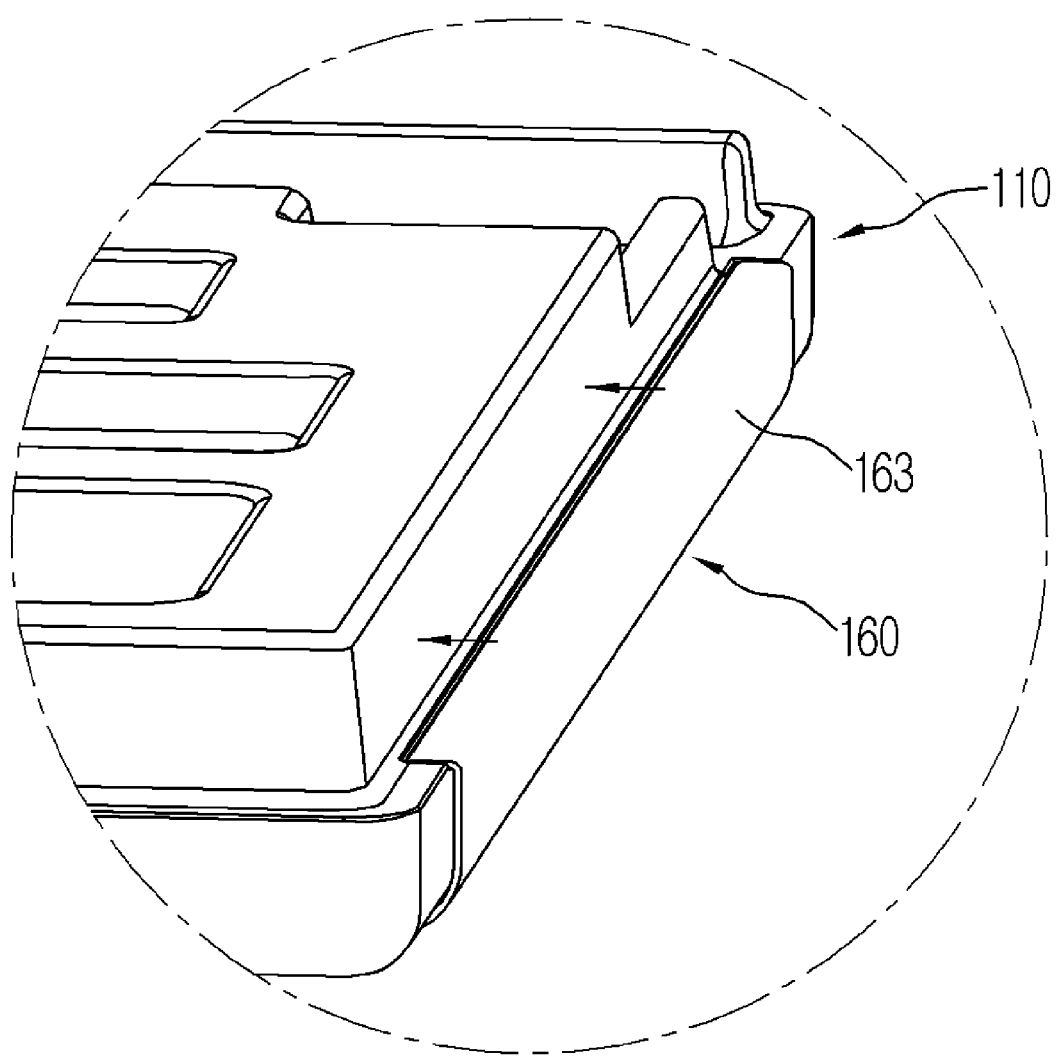

Referring to FIGS. 1 and 2, a reusable packaging box 100 includes a bottom unit 110 that has a receiving space in which a product P may be received, a lower body 120 and an upper body 130 that are provided to each have a box shape with open top and bottom and are coupled to a top of the bottom unit 110, and a lid 140 that has a receiving space in which the product P may be received and is coupled to the top of the upper body 130.

The reusable packaging box 100 is used to package and transport a large electronic product such as a refrigerator, a washing machine, an air conditioner, a large TV, or a network server so that the large electronic product is protected from an impact.

The bottom unit 110 and the lid 140 that respectively receive a top and a bottom of the product P and the lower body 120 and the upper body 130 that are disposed between the bottom unit 110 and the lid 140 are each formed of expanded polypropylene (EPP) with high durability.

A process of forming the bottom unit 110, the lower body 120, the upper body 130, and the lid 140 using EPP will be explained. EPP which is previously stored is pressurized for about 1 day and then is injected into a mold with a desired shape.

Once the EPP is injected into the mold, the EPP is formed using steam, is cooled using cooling water, and then is thermally treated and dried for about 1 day in order to prevent contraction.

Once the thermal treatment and drying is completed, the mold is removed, whether there is abnormality in the process is checked, the EPP is loaded and hardened, and the EPP is subjected to a final test, is unloaded, and is distributed as a product.

Each of the bottom unit 110, the lower body 120, the upper body 130, and the lid 140 is not limited to the EPP, and may be formed of any of other materials that may absorb an impact, has high durability, and has expandability.

Since the bottom unit 110, the lower body 120, the upper body 130, and the lid 140 are formed of the same material with high durability, that is, the EPP and an interior and an exterior of the reusable packaging box 100 are integrally formed with each other, the reusable packaging box 100 may perform both a function of absorbing an impact and a function of packing the outside of the product P.

Figure 10:
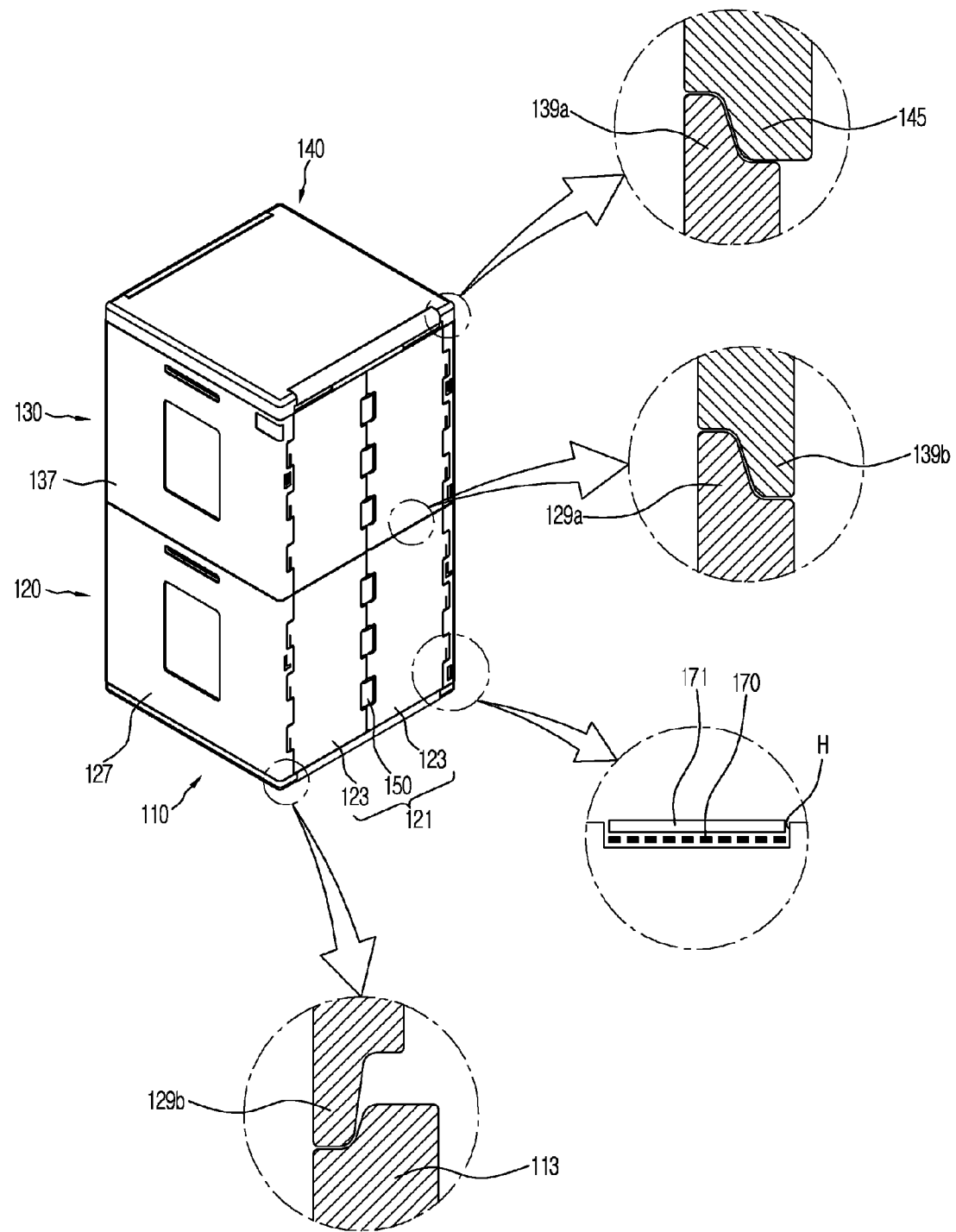
FIG. 10 is a perspective view illustrating a state where the reusable packaging box is coupled, according to an embodiment of the present invention.

As shown in FIG. 10, an attachment groove H may be formed in an outer surface of at least one of the bottom unit 110, the lower body 120, the upper body 130, and the lid 140, a barcode label 170 on which essential information needed to package and transport the product P is recorded may be attached to the attachment groove H, and a transparent pad 171 may be attached to an outer surface of the barcode label 170 to prevent the barcode label 170 from being contaminated and damaged.

The bottom unit 110 and the lid 140 are fixed using a strap S along with the lower body 120 and the upper body 130 to protect the product P therein. Contact portions between the bottom unit 110 and the lid 140, and the strap S may be deformed due to the strap S when used for a long time.

As shown in FIGS. 3 through 6, reinforcing members 160 may be coupled to the contact portions between the bottom unit 110 and the lid 140, and the strap S in order to prevent the contact portions from being deformed due to the strap S. The reinforcing members 160 may be coupled to both side surfaces of the bottom unit 110 contacting the strap S, and to both side surfaces of the lid 140 contacting the strap S.

In order to couple the reinforcing members 160, the bottom unit 110 and the lid 140 respectively include coupling units 111 and 141. The coupling units 111 and 141 respectively include insertion holes 111a and 141a into which insertion units 161 are inserted, and flange units 111b and 141b into which adhesive units 163 of the reinforcing members 160 are inserted.

The insertion holes 111a and 141a are respectively formed in a bottom of the bottom unit 110 and a top of the lid 140, and the flange units 111b and 141b may be provided to have stepped portions so as for the adhesive units 163 to be inserted thereinto after the insertion units 161 of the reinforcing members 160 are inserted into the insertion holes 111a and 141a.

Each of the reinforcing members 160 is formed of a material harder than the EPP that is a material of each of the bottom unit 110 and the lid 140, in order to prevent the contact portions from being deformed due to the strap S. The reinforcing members 160 are coupled to surround the coupling units 111 and 141 respectively provided on the bottom unit 110 and the lid 140.

A process of coupling the reinforcing member 160 to the coupling unit 141 provided on the lid 140 will be explained. The reinforcing member 160 is pushed downward such that the insertion unit 161 of the reinforcing member 160 is inserted into the insertion hole 141a of the lid 140, and once the insertion unit 161 is inserted into the insertion hole 141a, the reinforcing member 160 is pushed toward the lid 140 such that the adhesive unit 163 is coupled to contact and surround the coupling unit 141 of the lid 140.

A process of coupling the reinforcing member 160 to the coupling unit 111 provided on the bottom unit 110 is the same as the process of coupling the reinforcing member 160 to the coupling unit 141 provided on the lid 140 except that the reinforcing member 160 is pushed upward such that the insertion unit 161 of the reinforcing member 160 is inserted into the insertion hole 111a.

Figure 16:
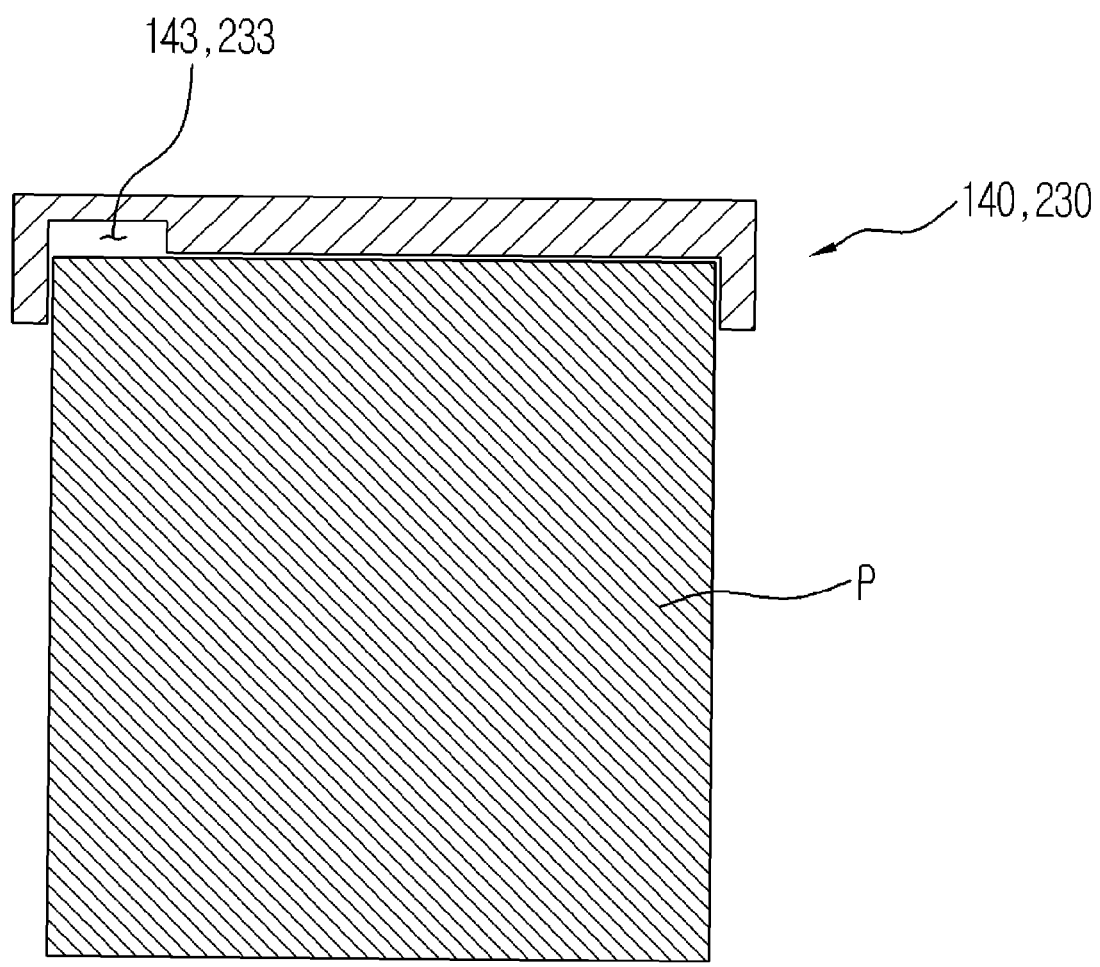
FIGS. 16 through 18 are cross-sectional views illustrating lids of the reusable packaging box, according to embodiments of the present invention.
Figure 17:
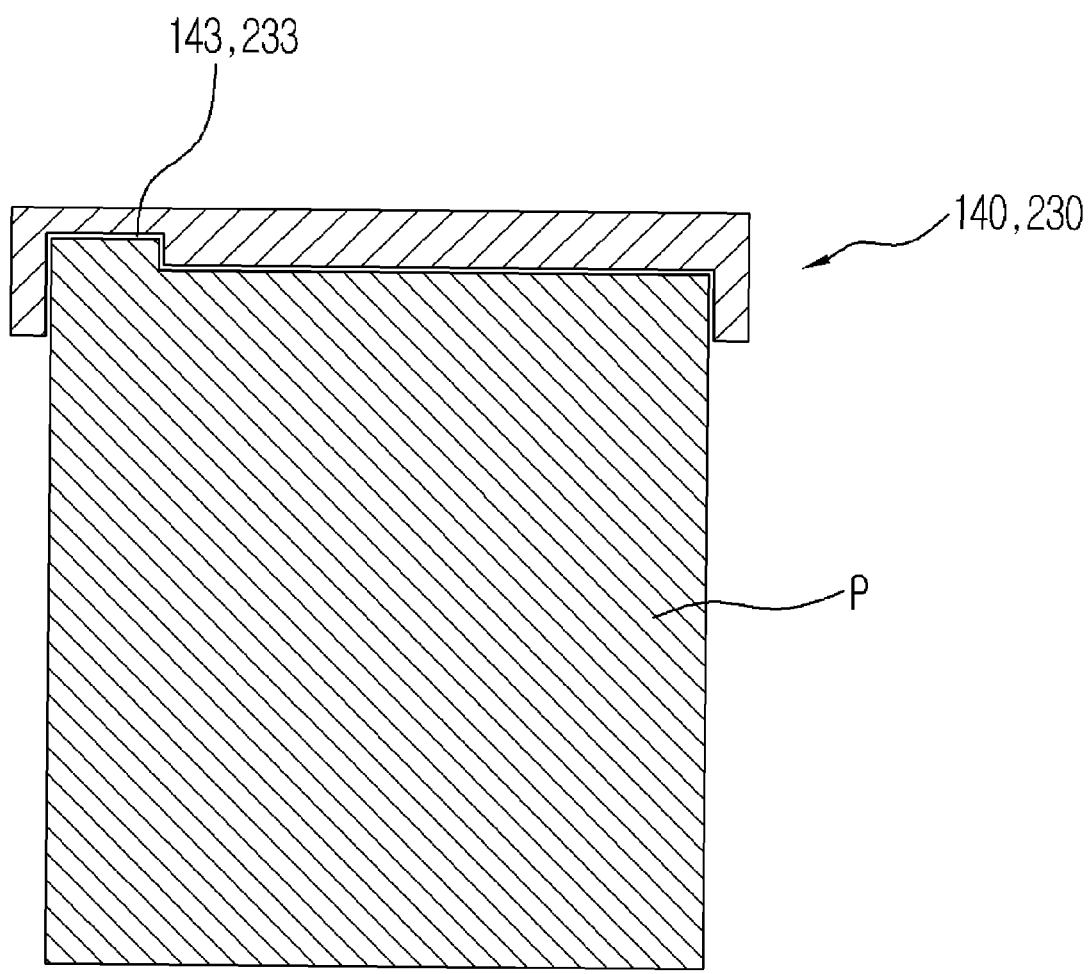
Figure 18:
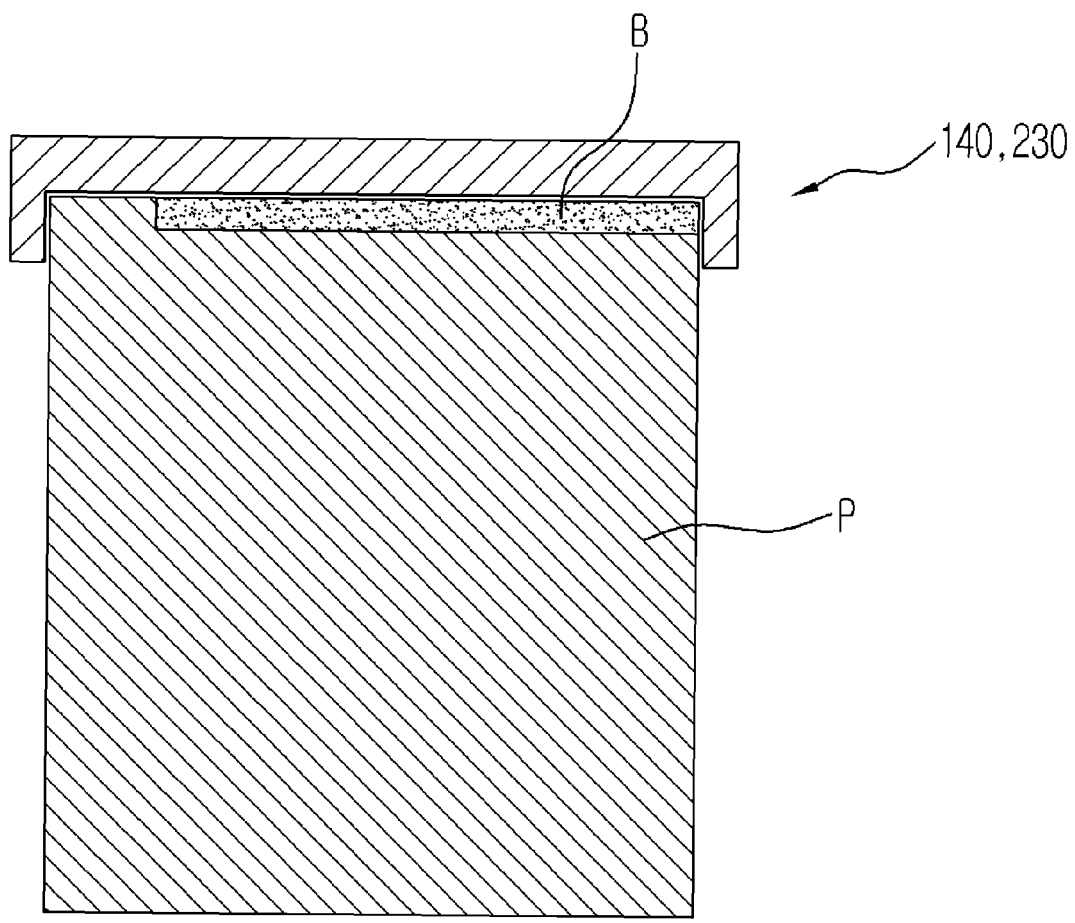

As shown in FIGS. 16 through 18, a receiving groove 143 that is curved upward is formed in a side of an inner surface of the lid 140.

As shown in FIG. 16, when the top of the product P received in the reusable packaging box 100 has no protrusion and has a flat surface, the product P may be packaged irrespective of a direction. As shown in FIG. 17, however, when the top of the product P has a protrusion, the product P is packaged such that the protrusion is received in the receiving groove 143.

Since the receiving groove 143 is formed in the lid 140, the reusable packaging box 100 may package any product P without replacing the lid 140 or changing the inner surface of the lid 140 according to a shape of the product P.

As shown in FIG. 18, even when the top of the lid 140 has a flat inner surface, just in case the top of the product P has a protrusion, an auxiliary board B may be inserted between the lid 140 and the product P to fill a stepped space formed due to the protrusion of the product P.

Figure 7:
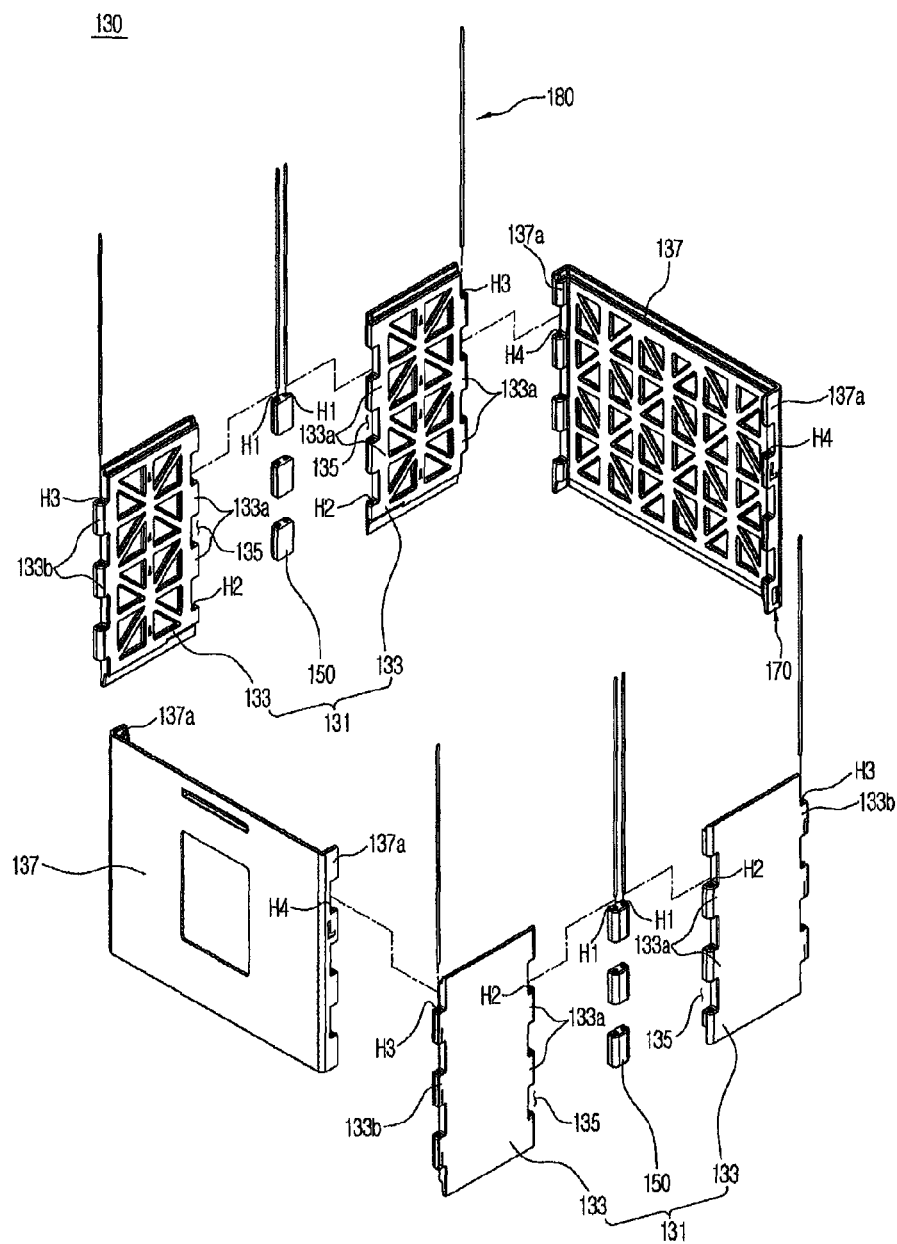
FIG. 7 is an exploded perspective view illustrating an upper body according to an embodiment of the present invention.

As shown in FIGS. 1, 2, and 7, the lower body 120 and the upper body 130 are provided to each have a box shape with open top and bottom.

The lower body 120 is assembled on the top of the bottom unit 110, and the upper body 130 is assembled on the top of the lower body 120.

The lower body 120 and the upper body 130 include left and right plates 121 and 131, and front and back plates 127 and 137, respectively. Since the left and right plates 121 and the front and back plates 127 provided on the lower body 120 and the left and right plates 131 and the front and back plates 137 provided on the upper body 130 are provided to have the same structure, only structures of the left and right plates 131 and the front and back plates 137 of the upper body 130 will be explained.

Each of the left and right plates 131 of the upper body 130 includes two side plates 133, and a plurality of hinge members 150 that are disposed between the two side plates 133 and are coupled such that the two side plates 133 may rotate in left and right directions.

The two side plates 133 include a plurality of first connection units 133a that protrude from facing sides of the two side plates 133 which are adjacent to each other.

An empty space is formed between the plurality of first connection units 133a. When the two side plates 133 are disposed adjacent to each other, a plurality of coupling grooves 135 into which the hinge members 150 are inserted are formed between the plurality of first connection units 133a.

The hinge members 150 are respectively inserted into the plurality of coupling grooves 135. Two first hinge holes H1 are formed in both sides of each of the plurality of hinge members 150, and second hinge holes H2 are formed in the plurality of first connection units 133a that form the plurality of coupling grooves 135 to correspond to the two first hinge holes H1.

When the plurality of hinge members 150 are respectively inserted into the plurality of coupling grooves 135 such that one of the two first hinge holes H1 and the second hinge holes H2 are aligned, a hinge shaft 180 is inserted to pass through the first hinge holes H1 and the second hinge holes H2 so that one of the two side plates 133 and one side of the plurality of hinge members 150 are coupled to each other.

When the one side of the plurality of hinge members 150 and the one of the two side plates 133 are coupled to each other, the plurality of hinge members 150 are respectively inserted into the plurality of coupling grooves 135 such that the other sides of the plurality of hinge members 150 and the remaining side plate 133 from among the two side plates 133 are coupled to each other to align the first hinge hole H1 and the second hinge hole H2. Next, another hinge shaft 180 is inserted to pass through the first hinge hole H1 and the second hinge hole H2 so that the remaining side plate 133 and the other sides of the plurality of hinge members 150 are coupled to each other.

As described above, since each of the plurality of hinge members 150 has a double hinge structure in which two first hinge holes H1 are formed in both sides, the two side plates 133 respectively coupled to both sides of the plurality of hinge members 150 may rotate in the left and right directions about the plurality of hinge members 150.

A plurality of second connection units 133b protrude from the other sides of the two side plates 133 to be connected to the front and back plates 137. A plurality of third connection units 137a protrude from the front and back plates 137 connected to the other sides of the two side plates 133 to form a plurality of grooves into which the plurality of second connection units 133b are inserted.

Third hinge holes H3 are formed in the plurality of second connection units 133b, and fourth hinge holes H4 are formed in the plurality of third connection units 137a to correspond to the third hinge holes H3.

After the plurality of second connection units 133b that are provided on the other sides of the two side plates 133 are inserted into the plurality of grooves formed in the front and back plates 137 between the plurality of third connection units 137a, another hinge shaft 180 is inserted to pass through the third hinge holes H3 and the fourth hinge holes H4 such that the third hinge holes H3 and the fourth hinge holes H4 aligned, and the other sides of the two side plates 133 and the front and back plates 137 are connected to each other.

As described above, since the left and right plates 131 are connected to the front and back plates 137 to rotate in the left and right directions using the hinge shafts 180 and the two side plates 133 constituting the left and right plates 131 are coupled to the plurality of hinge members 150 to rotate in the left and right directions, the lower body 120 and the upper body 130 may be stored after being folded in order to reuse the reusable packaging box 100.

Figure 8:
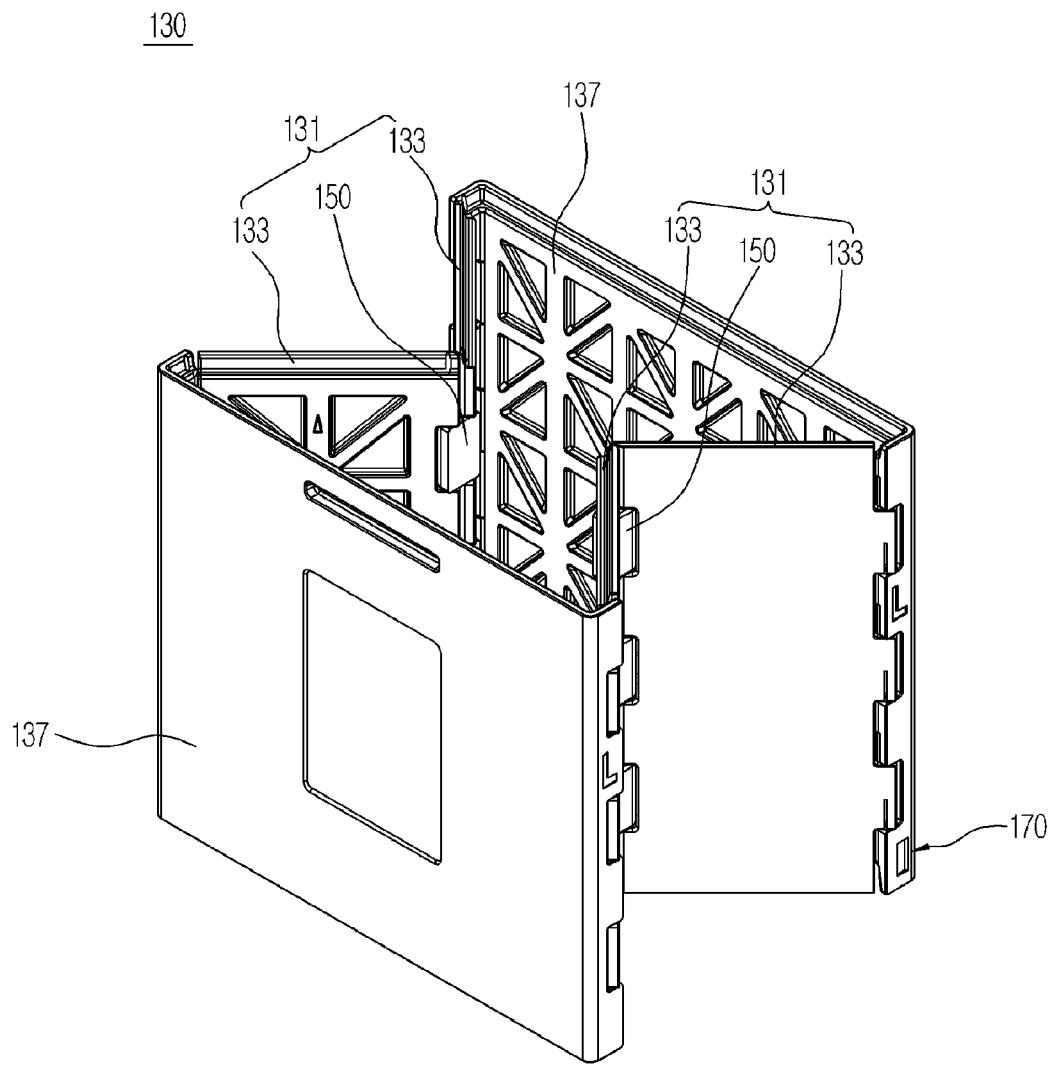
FIG. 8 is a perspective view illustrating a state where the upper body is folded, according to an embodiment of the present invention.

After the product P is completely transported, assuming that the reusable packaging box 100 is to be stored in order to be reused, as shown in FIG. 8, when central portions of the left and right plates 131 of the upper body 130 are folded inward, one side of the two side plates 133 constituting the left and right plates 131 rotates about the plurality of hinge members 150, and the other sides of the two side plates 133 rotate about the front and back plates 137 to fold the left and right plates 131 of the upper body 130, thereby making it possible to store the upper body 130 with a reduced volume.

Since the lower body 120 is stored after being folded in the same manner as that of the upper body 130, an explanation thereof will not be given.

Figure 9:
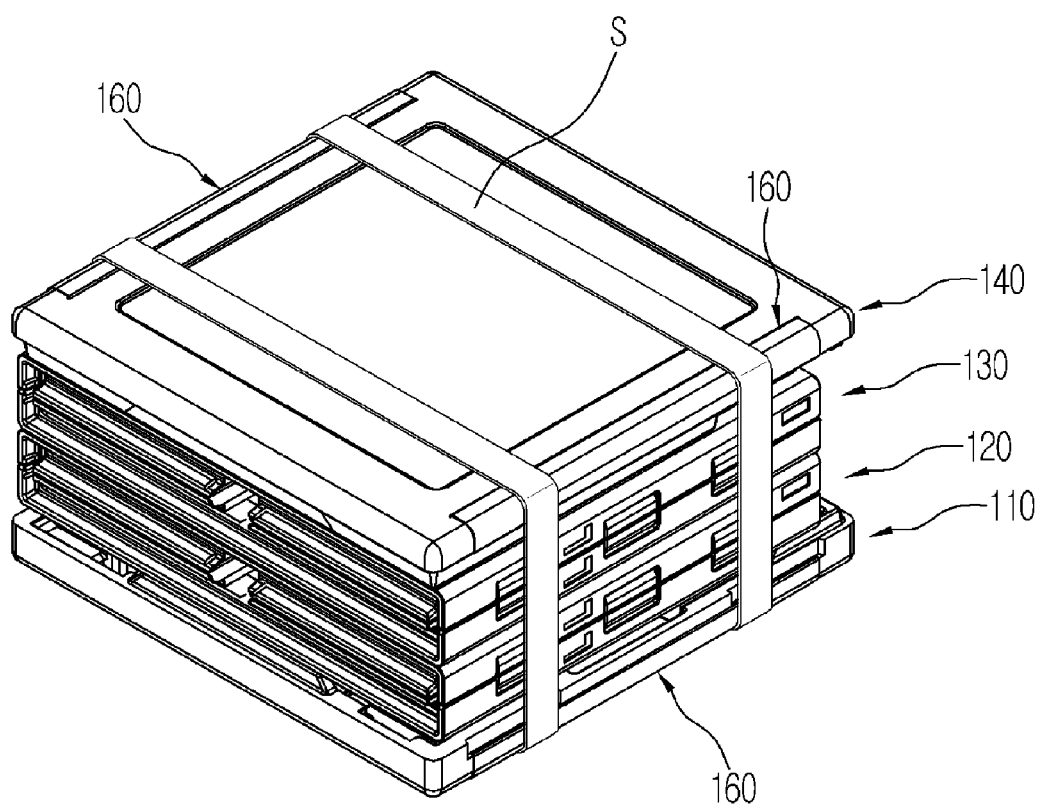
FIG. 9 is a perspective view illustrating a state where the reusable packaging box is stored after being folded, according to an embodiment of the present invention.

After both the lower body 120 and the upper body 130 are folded, as shown in FIG. 9, the lower body 120 and the upper body 130 are laid down and stacked between the bottom unit 110 and the lid 140.

Once the lower body 120 and the upper body 130 are stacked between the bottom unit 110 and the lid 140, the lower body 120 and the upper body 130 are stored after being fixed using the strap S.

Although the lower body 120 and the upper body 130 are stacked between the bottom unit 110 and the lid 140 after being folded in FIG. 9, in order to reduce an overall volume of the reusable packaging box 100 during storage, the lid 140 may be directly stacked on the bottom unit 110 such that a protrusion in the bottom unit 110 is inserted into the receiving space of the lid 140, and the lower body 120 and the upper body 130 may be stored after being folded and stacked on the top of the lid 140.

Once the lid 140 is directly stacked on the top of the bottom unit 110, since a thickness obtained by stacking the bottom unit 110 and the lid 140 is less than a thickness obtained by summing a thickness of the bottom unit 110 and that of the lid 140, a volume may be reduced.

As described above, since the lower body 120 and the upper body 130 are stored after being folded, a volume of the reusable packaging box 100 may be greatly reduced and may be easily stored. When the reusable packaging box 100 is to be reused, the reusable packaging box 100 may be repeatedly reused by unfolding the lower body 120 and the upper body 130.

As shown in FIG. 10, coupling structures for coupling the bottom unit 110, the upper body 130, the lower body 120, and the lid 140 are respectively provided on the bottom unit 110, the upper body 130, the lower body 120, and the lid 140. The lower body 120 includes a lower body coupling unit 129 that includes a first coupling unit 129a that is provided in an upper portion and is coupled to the upper body 130 and a second coupling unit 129b that is provided in a lower portion and is coupled to the bottom unit 110.

The upper body 130 includes an upper body coupling unit 139 that includes a third coupling unit 139a that is provided in an upper portion and is coupled to the lid 140 and a fourth coupling unit 139b that is provided in a lower portion and is coupled to the lower body 120.

The bottom unit 110 includes a bottom coupling unit 113 that is coupled to the second coupling unit 129b that is provided in the lower portion of the lower body 120, and the lid 140 includes a lid coupling unit 145 that is coupled to the third coupling unit 139a that is provided in the upper portion of the upper body 130.

The first coupling unit 129a is provided to protrude upward from the upper portion of the lower body 120, have a lower end with a thickness less than a thickness of the lower body 120, and extend such that a thickness decreases upward from the lower end toward an outside of the lower body 120.

The fourth coupling unit 139b of the upper body 130 coupled to the first coupling unit 129a of the lower body 120 is provided to have a shape corresponding to the first coupling unit 129a and helps the lower body 120 and the upper body 130 to be easily coupled to each other.

The second coupling unit 129b is provided to protrude downward from the lower portion of the lower body 120, have an upper end with a thickness less than a thickness of the lower body 120, and extend such that a thickness decreases downward from the upper end toward the outside of the lower body 120.

The bottom coupling unit 113 of the bottom unit 110 coupled to the second coupling unit 129b of the lower body 120 is provided to have a shape corresponding to the second coupling unit 129b and helps the lower body 120 and the bottom unit 110 to be easily coupled to each other.

The third coupling unit 139a is provided to protrude upward from the upper portion of the upper body 130, have a lower end with a thickness less than a thickness of the upper body 130, and extend that a thickness decreases upward from the lower end toward an outside of the upper body 130.

The lid coupling unit 145 of the lid 140 coupled to the third coupling unit 139a of the upper body 130 is provided to have a shape corresponding to the third coupling unit 139a and helps the upper body 130 and the lid 140 to be easily coupled to each other.

Figure 11:
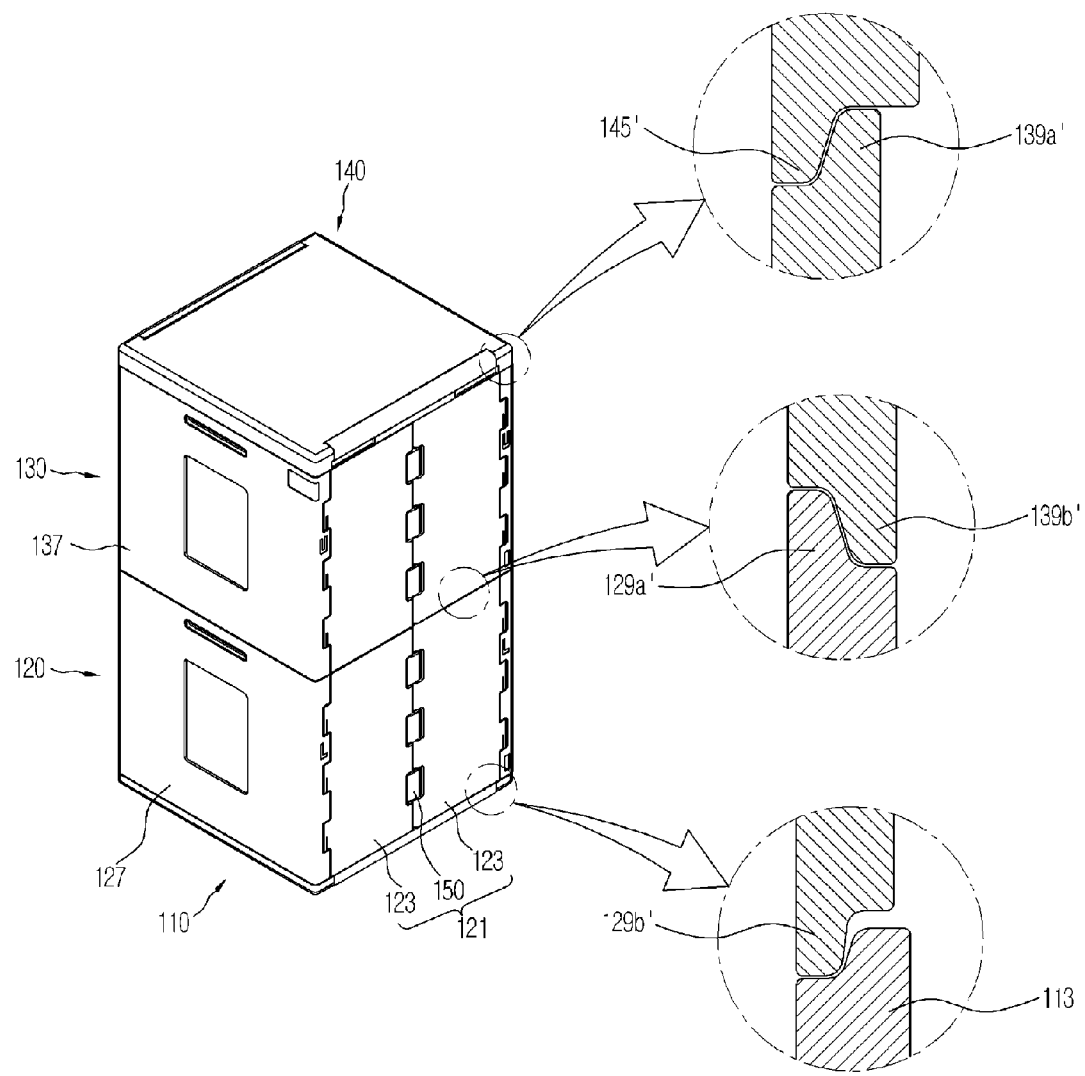
FIG. 11 is a perspective view illustrating a state where the reusable packaging box is coupled, according to another embodiment of the present invention.

As shown in FIG. 11, the coupling structures respectively provided on the bottom unit 110, the upper body 130, the lower body 120, and the lid 140 may be different from the coupling structures respectively provided on the upper body 130 and the lid 140.

A structure of a first coupling unit 129a' and a fourth coupling unit 139b' in the coupling structures of the upper body 130 and the lower body 120, and a structure of a bottom coupling unit 113' of the second coupling unit 129b' in the coupling structures of the lower body 120 and the bottom unit 110 may be the same as those of FIG. 10, and a length of a protrusion may vary according to a type of the product P.

In the coupling structures of the upper body 130 and the lid 140, a third coupling unit 139a' provided in the upper portion of the upper body 130 may be provided to protrude upward from the upper portion of the upper body 130, have a lower end with a thickness less than a thickness of the upper body 130, and extend such that a thickness decreases upward from the lower end toward the inside of the upper body 130.

A lid coupling unit 145' of the lid 140 coupled to the third coupling unit 139a' of the upper body 130 may be provided to have a shape corresponding to the third coupling unit 139a' and may help the upper body 130 and the lid 140 to be easily coupled to each other.

Figure 12:
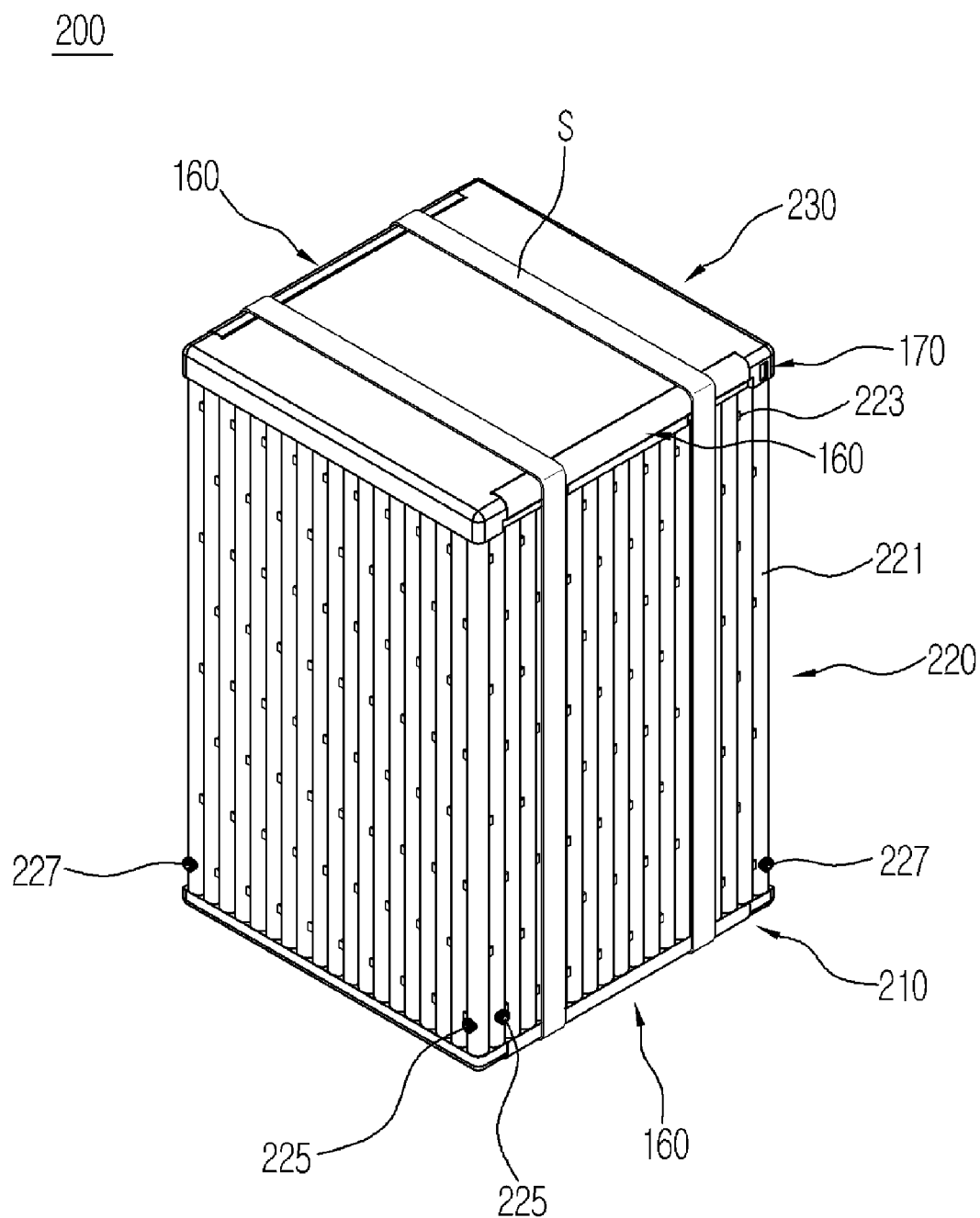
FIG. 12 is a perspective view illustrating a reusable packaging box according to another embodiment of the present invention.
Figure 13:
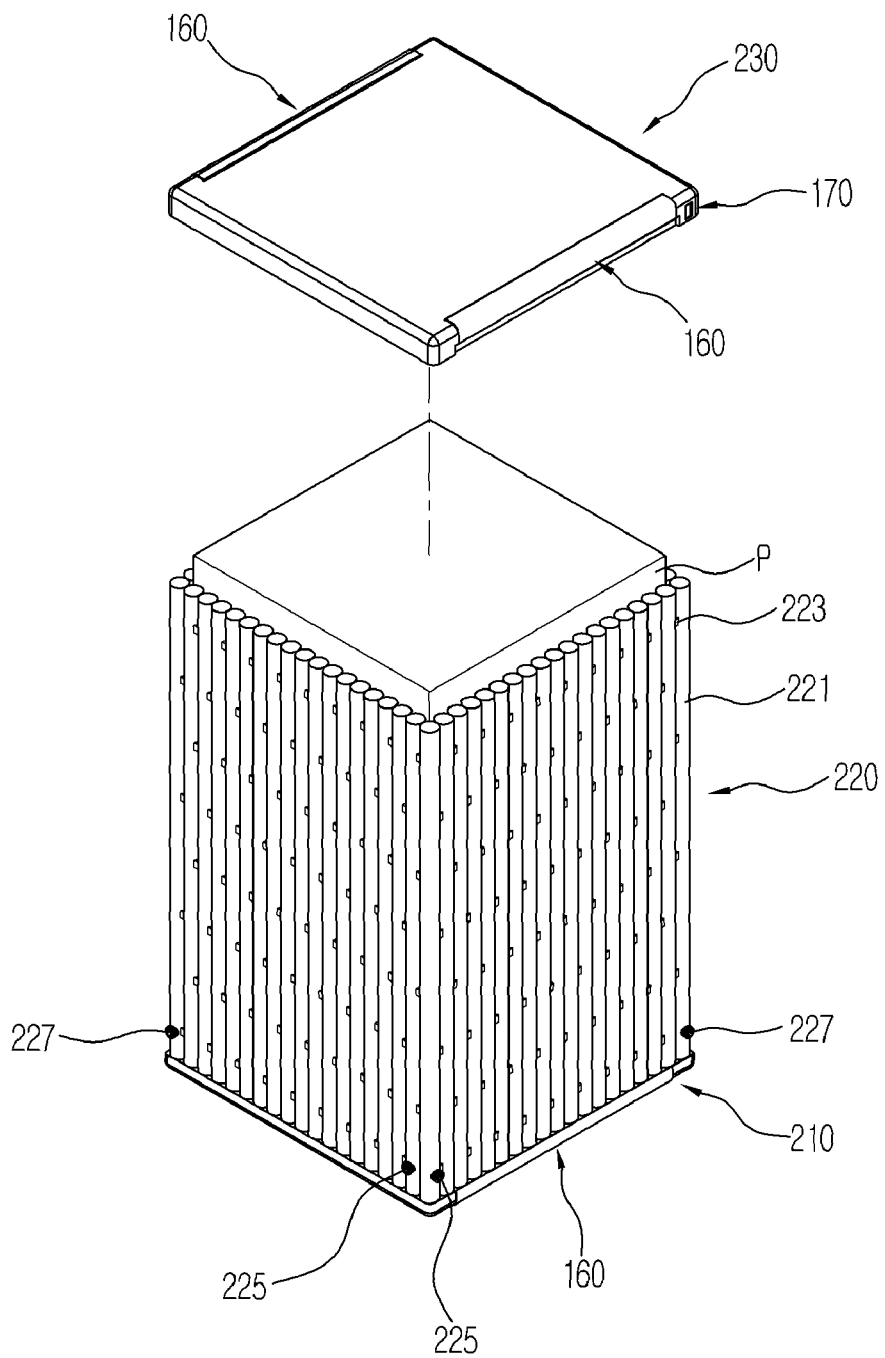
FIG. 13 is an exploded perspective view illustrating the reusable packaging box of FIG. 12.

As shown in FIGS. 12 and 13, a reusable packaging box 200 includes a bottom unit 210 that has a receiving space in which the product P may be received, an air tube 220 that is provided to have a box shape with open top and bottom and is coupled to a top of the bottom unit 210, and a lid 230 that has a receiving space in which the product P may be received and is coupled to the top of the air tube 220.

The reinforcing members 160 are coupled to the bottom unit 210 and the lid 230 to prevent contact portions from being deformed due to the strap S, the bottom unit 210 and the lid 230 are each formed of EPP, the attachment groove H is formed in at least one of the bottom unit 210 and the lid 230, the barcode label 170 and the transparent pad 171 are attached to the attachment groove H, a receiving groove 233 is formed in a side of an inner surface of the lid 230, and the auxiliary board B fills a stepped space formed due to a protrusion, like in the reusable packaging box 100 of FIGS. 1 and 2, and thus an explanation thereof will not be given.

The air tube 220 coupled between the bottom unit 210 and the lid 230 has four surfaces on which a plurality of air cells 221 are provided. An air inlet 225 and an air outlet 227 are formed in a lower end of each of the four surfaces to repeatedly introduce or discharge air.

The plurality of air cells 221 provided on each of the four surfaces of the air tube 220 are connected to one another by connection tubes 223. Accordingly, when air is introduced through the air inlet 225, air is introduced into all of the plurality of air cells 221 provided on each of the four surfaces. When air is discharged through the air outlet 227, air is discharged from all of the plurality of air cells 221 provided on each of the four surfaces.

A process of packaging the product P in the reusable packaging box 200 will be explained. The product P is located on the bottom of the bottom unit 210 such that the bottom of the product P is received in the receiving space of the bottom unit 210, and the air tube 220 is coupled to the top of the bottom unit 210 such that the product P is received in the air tube 220 in a state where air is not introduced.

Once the air tube 220 is coupled to the top of the bottom unit 210, air is introduced through the air inlet 225 to inflate the air tube 220. The air tube 220 closely contacts the product P, thereby performing a function of absorbing an impact on the product P.

When air is completely introduced into the air tube 220, the top of the product P is covered with the lid 230, and then the lid 230 and the product P are fixed using the strap S.

Since the air tube 220 may function as a buffering member, the air tube 220 may perform both a function of packaging the outside of the product P and a function of absorbing an impact along with the bottom unit 210 and the lid 230 formed of the same material with high durability, that is, EPP.

Figure 14:
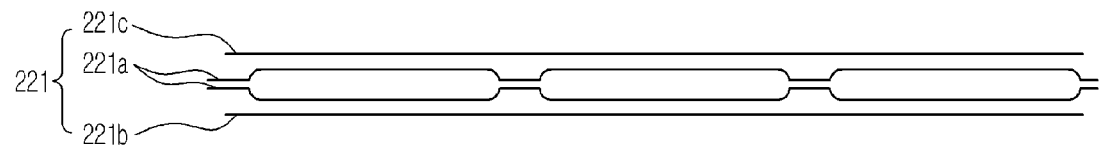
FIG. 14 is a cross-sectional view illustrating an air cell of the reusable packaging box of FIG. 12.

As shown in FIG. 14, each of the air cells 221 includes an inner tube 221*a*, and an inner lining 221*b* and an outer cladding 221*c* which are provided outside the inner tube 221*a*.

The inner tube 221*a* that absorbs an impact on the product P is formed of two layers of thermoplastic polyurethane (TPU) with high durability and harmlessness to human body. Each of the inner lining 221*b* and the outer cladding 221*c* contacting the product P is formed of a nylon-based fabric that is strong against friction or the like.

Figure 15:
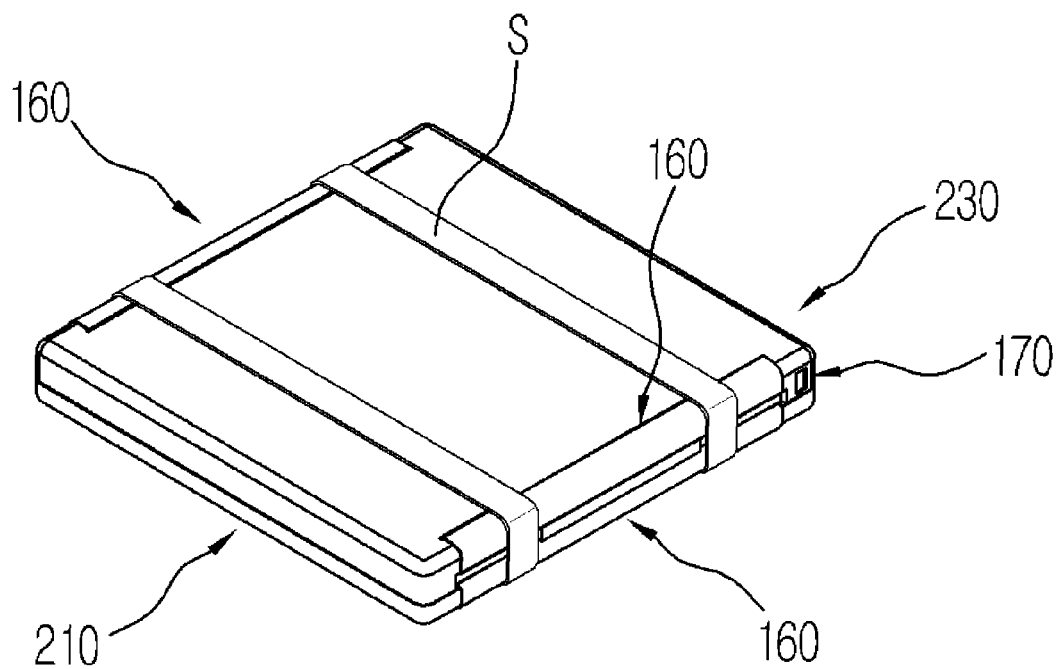
FIG. 15 is a perspective view illustrating a state where the reusable packaging box of FIG. 12 is stored.

After the product P is completely transported, when the reusable packaging box 200 is retrieved and stored in order to be reused, as shown in FIG. 15, air of the air tube 220 is discharged through the air outlet 227 provided in the air tube 220, and then the reusable packaging box 200 is folded and is inserted into the receiving spaces of the lid 230 and the bottom unit 210.

Once the air tube 220 is received between the bottom unit 210 and the lid 230, the air tube 220, the bottom unit 210, and the lid 230 are stored after being fixed using the strap S.

As described above, since the air tube 220 is stored after being folded, a volume of the reusable packaging box 200 may be greatly reduced and may be easily stored. When the reusable packaging box 200 is to be reused, the reusable packaging box 200 may be repeatedly reused by introducing air into the air tube 220.

Figure 19:
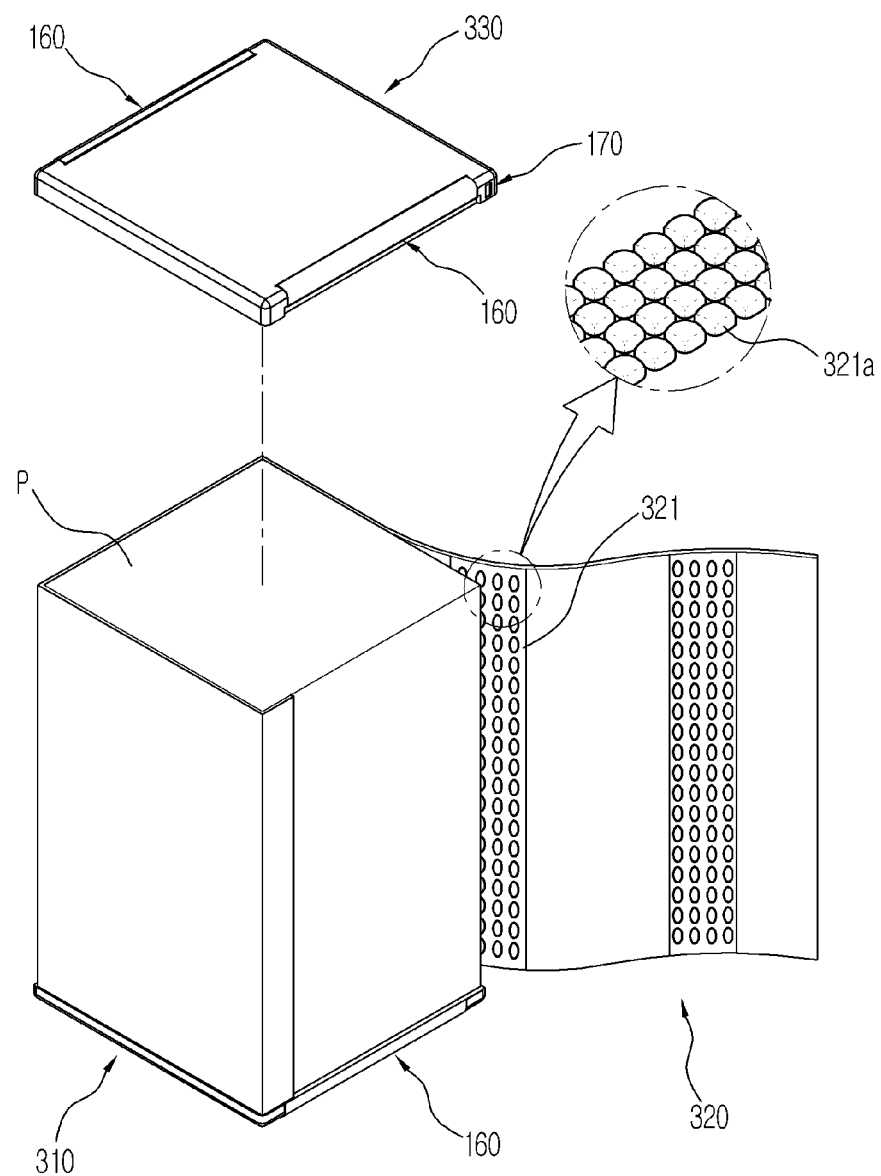
FIGS. 19 through 21 are perspective views illustrating reusable packaging boxes according to other embodiments of the present invention.

As shown in FIG. 19, a reusable packaging box 300 includes a bottom unit 310 that has a receiving space in which the product P may be received, an air cell blanket 320 that is provided to surround a portion of the product P exposed to the outside of the bottom unit 310, and a lid 330 that has a receiving space in which the product P may be received and is provided on a top of the air cell blanket 320 to cover the top of the product P.

The reinforcing members 160 are coupled to the bottom unit 310 and the lid 330 to prevent contact portions from being deformed due to the strap S, the bottom unit 310 and the lid 330 are each formed of EPP, the attachment groove H is formed in at least one of the bottom unit 310 and the lid 330, and the barcode label 170 and the transparent pad 171 are attached to the attachment groove H, like in the reusable packaging box 100 of FIGS. 1 and 2, and thus an explanation thereof will not be given.

The air cell blanket 320 includes a plurality of air cell units 321 in order to absorb an impact on the product P. The air cell units 321 may include a plurality of air cells 321*a*.

Since the air cell blanket 320 may function as a buffering member, the air cell blanket 320 may perform both a function of absorbing an impact and a function of packing the outside of the product P along with the bottom unit 310 and the lid 330 formed of the same material with high durability, that is, EPP.

Since the air cell blanket 320 having been transported is folded, is inserted between the bottom unit 310 and the lid 330, and then is stored after being fixed using the strap S, the reusable packaging box 300 may be repeatedly reused.

Figure 20:
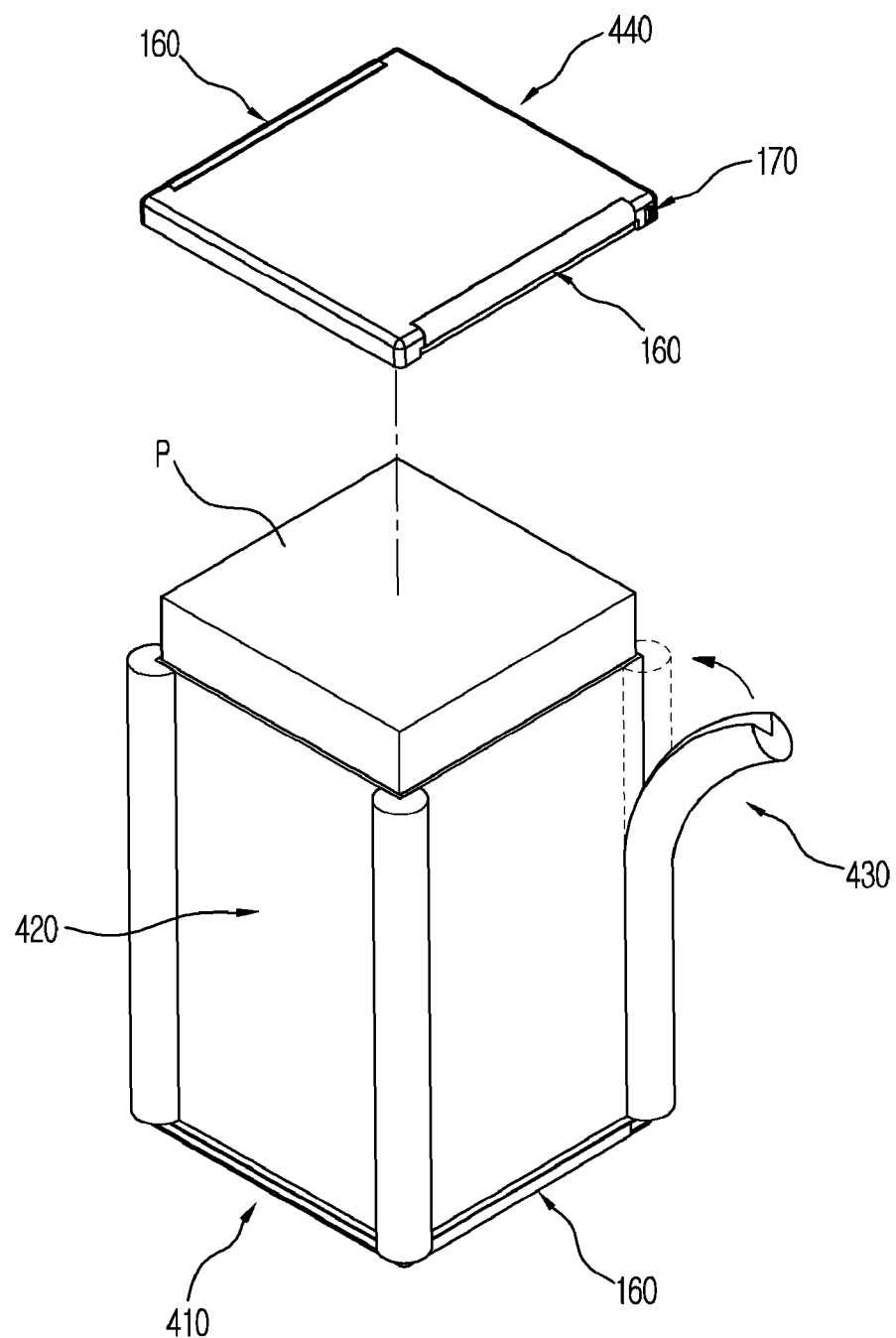

As shown in FIG. 20, a reusable packaging box 400 includes a bottom unit 410 that has a receiving space in which the product P may be received, a fabric blanket 420 that is provided to surround a portion of the product P exposed to the outside of the bottom unit 410, velcros 430 that are detachably adhered to edge portions of the product P surrounded by the fabric blanket 420 and absorb an impact on the product P, and a lid 440 that is provided on a top of the fabric blanket 420 to receive a portion of the product P exposed to the outside of the fabric blanket 420.

The reinforcing members 160 are coupled to the bottom unit 410 and the lid 440 to prevent contact portions from being deformed due to the strap S, the bottom unit 410 and the lid 440 are each formed of EPP, the attachment groove H is formed in at least one of the bottom unit 410 and the lid 440, and the barcode label 170 and the transparent pad 171 are attached to the attachment groove H, like in the reusable packaging box 100 of FIGS. 1 and 2, and thus an explanation thereof will not be given.

Since the velcros 430 function as a buffering member, the velcros 430 may perform both a function of absorbing an impact and a function of packaging the outside of the product P along with the bottom unit 410 and the lid 440 formed of the same material with high durability, that is, EPP.

Since the velcro 430 having been transported is separated, the fabric blanket 420 is folded and inserted between the bottom unit 410 and the lid 440 along with the velcro 430, and then the fabric blanket 420 is stored after being fixed using the strap S, the reusable packaging box 400 may be repeatedly reused.

Figure 21:
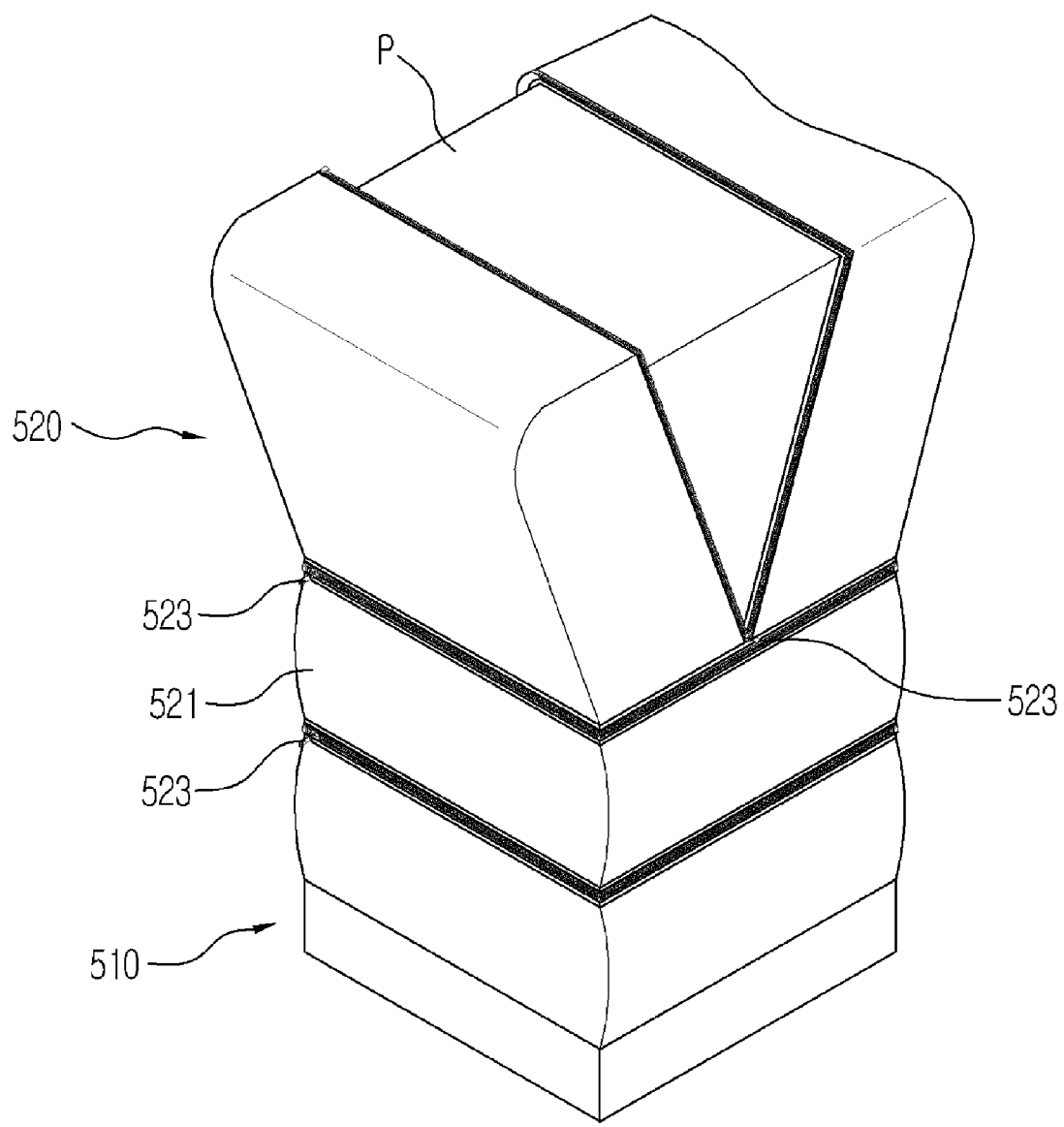
Figure 22:
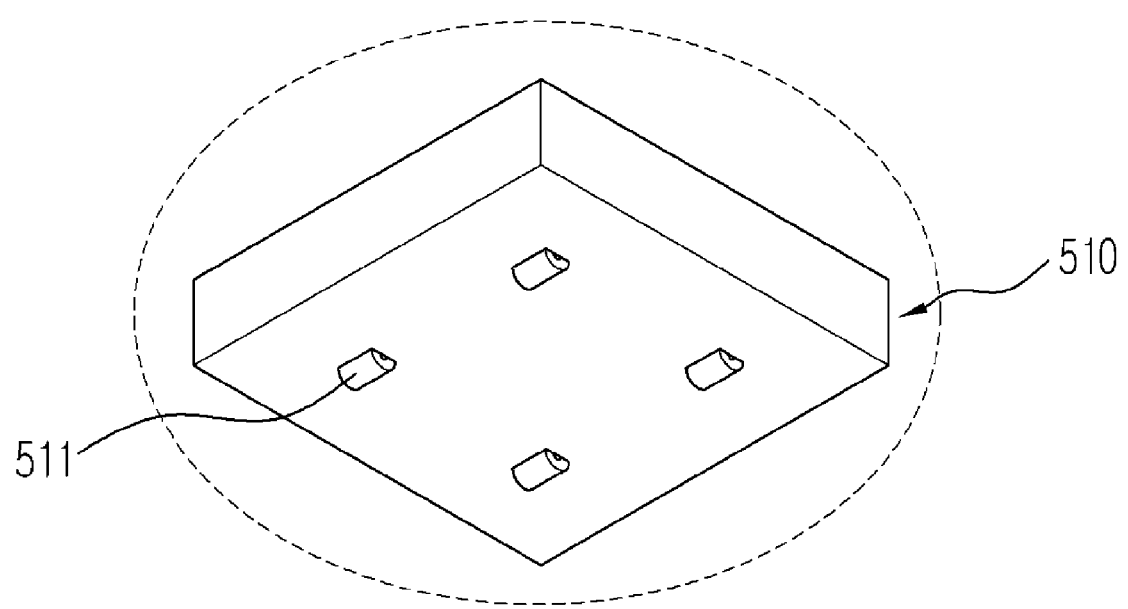
FIG. 22 is a perspective view illustrating a bottom unit of the reusable packaging box of FIG. 20.

As shown in FIG. 21, a reusable packaging box 500 includes a bottom unit 510 that has a receiving space in which the product P may be received, and a fabric blanket 520 that is coupled to a top of the bottom unit 510 and has a receiving space in which the product P may be received.

The bottom unit 510 may be formed of EPP with high durability, and as shown in FIG. 21, a wheel 511 may be provided in a bottom surface of the bottom unit 510 and thus the bottom unit 510 may easily move.

The fabric blanket 520 includes a height adjusting unit 521 that receives the product P to be packaged by being opened and closed using a zipper 523 and may adjust a height to correspond to a size of the product P.

The height adjusting unit 521 is coupled to and separated from the fabric blanket 520 using the zipper 523. When a size of the product P is great, the product P is packaged by coupling the height adjusting unit 521 to the fabric blanket 520, and when a size of the product P is small, the product P may be packaged by separating the height adjusting unit 521 from the fabric blanket 520.

Since the fabric blanket 520 having been transported is folded, inserted into the receiving space of the bottom unit 510, and then stored after being folded, the reusable packaging box 500 may be repeatedly reused.

As is apparent from the above description, according to the embodiments of the present invention, costs may be reduced. Since durability of a packaging box is improved, a function of protecting a product may be enhanced.

Also, since an interior and an exterior are integrally formed with each other, a process of assembling elements of the packaging box may be simplified. Since the amount of waste is reduced, environmental contamination may be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A packaging box comprising:
a bottom unit that has a receiving space to receive a product;
at least one body to be unfolded to have a box shape with an open top and an open bottom to form an interior space, and configured to be coupled to at least one other body and a top of the bottom unit when configured to have the box shape, the at least one body comprising:
a left plate and a right plate, the left plate comprising two left side plates and the right plate comprising two right side plates;
a plurality of hinge members, each hinge member having a double hinge structure that includes two holes;
a front plate comprising hinge holes to be single hinge-coupled to a first left side plate among the two left side plates and a first right side plate among the two right side plates;
a back plate comprising hinge holes to be single hinge-coupled to a second left side plate among the two left side plates and a second right side plate among the two right side plates; and
a lid that has a receiving space to receive the product and is configured to be coupled to the open top of the at least one body,
wherein
the two left side plates are configured to be hinge-coupled to one another using the two holes of at least one hinge member among the plurality of hinge members;
the two right side plates are configured to be hinge-coupled to one another using the two holes of at least one hinge member among the plurality of hinge members;
the hinge-coupled two left side plates and the hinge-coupled two right side plates are foldable to left and right directions by the two holes of each hinge member of the plurality of hinge members to be foldable inwardly towards the interior space in a collapsed position and outwardly from the interior space; and
the plurality of hinge members is positioned in-between the folded two left side plates and the folded two right side plates when the hinge-coupled two left side plates and the hinge-coupled two right side plates are folded inwardly towards the interior space by the two holes of the at least one hinge member;
whereby the collapsed position forms a space in between the front plate and the back plate for a thickness of the folded hinge-coupled two left side plates and a thickness of the folded hinge-coupled two right side plates.

2. The packaging box of claim 1, wherein the bottom unit and the lid are fixed using a strap along with the at least one body, and reinforcing members are coupled to contact portions between the strap, and the bottom unit and the lid to prevent the contact portions from being deformed due to the strap.

3. The packaging box of claim 2, wherein coupling unit to which the reinforcing member are coupled are provided on the bottom unit and the lid, and each of the coupling units comprises an insertion hole into which an insertion unit of each of the reinforcing members is inserted and a flange unit into which an adhesive unit of each of the reinforcing member is inserted and coupled.

4. The packaging box of claim 2, wherein when the at least one body is stored after being folded in order to reuse the reusable packaging box, the at least one body is laid down and stacked between the bottom unit and the lid, and is fixed using the strap.

5. The packaging box of claim 1, wherein each of the left and right plates comprise a plurality of coupling grooves into which each hinge member of the plurality of hinge members is inserted and coupled, and the plurality of coupling grooves are formed by a plurality of first connection units that protrude from one side of the left plate and one side of the right plate.

6. The packaging box of claim 5 wherein a plurality of second connection units protrude from the other side of the left plate and the other side of the right plate to be connected to the front and back plates, and a plurality of third connection units protrude from the front and back plates to form a plurality of grooves into which the plurality of second connection units are inserted.

7. The packaging box of claim 5, wherein first hinge holes are formed in each of the plurality of hinge members, second hinge holes are formed in the plurality of first connection units to correspond to the two first hinge holes, and the left and right plates are rotatably coupled to the plurality of hinge members using hinge shafts inserted into the first hinge holes and the second hinge holes.

8. The packaging box of claim 6, wherein third hinge holes are formed in the plurality of second connection units, fourth hinge holes are formed in the plurality of third connection units to correspond to the third hinge holes, and the left and right plates are rotatably coupled to the front and back plates using hinge shafts inserted into the third hinge holes and the fourth hinge holes.

9. The packaging box of claim 1, wherein an attachment groove is formed in an outer surface of at least one of the bottom unit, the at least one body, and the lid, a barcode label on which information needed to package and transport the product received therein is recorded is attached to the attachment groove, and a transparent pad is attached to an outer surface of the barcode label to prevent the barcode label from being contaminated and damaged.

10. The packaging box of claim 1, wherein the at least one body comprises a lower body and an upper body, the lower body comprises a lower body coupling unit comprising a first coupling unit that is provided in an upper portion of the lower body and is coupled to the upper body and a second coupling unit that is provided in a lower portion of the lower body and is coupled to the bottom unit, and the upper body comprises an upper body coupling unit comprising a third coupling unit that is provided in an upper portion of the upper body and is coupled to the lid and a fourth coupling unit that is provided in a lower portion of the upper body and is coupled to the lower body.

11. The packaging box of claim 10, wherein the bottom unit comprises a bottom coupling unit that is coupled to the second coupling unit of the lower body, and the lid comprises a lid coupling unit that is coupled to the third coupling unit of the upper body.

12. The packaging box of claim 11, wherein:
the first coupling unit is provided to:
    protrude upward from the upper portion of the lower body,
    have a lower end with a thickness less than a thickness of the lower body, and
    extend such that a thickness decreases from the lower end upward to an outside of the lower body, and
the fourth coupling unit is provided to:
    protrude downward from the lower portion of the upper body,
    have an upper end with a thickness less than a thickness of the upper body, and
    extend such that a thickness decreases from the upper end downward to an outside of the upper body, and
    have a shape corresponding to the first coupling unit.

13. The packaging box of claim 11, wherein the second coupling unit is provided to protrude downward from the lower portion of the lower body, have an upper end with a thickness less than a thickness of the lower body, and extend such that a thickness decreases downward from the upper end toward an outside of the lower body, and the bottom coupling unit is provided to have a shape corresponding to the second coupling unit.

14. The packaging box of claim 11, wherein the third coupling unit is provided to protrude upward from the upper portion of the upper body, have a lower end with a thickness less than a thickness of the upper body, and extend such that a thickness decreases upward from the lower end toward an outside of the upper body, and the lid coupling unit is provided to have a shape corresponding to the third coupling unit.

15. The packaging box of claim 11, wherein the third coupling unit is provided to protrude upward from the upper portion of the upper body, have a lower end with a thickness less than a thickness of the upper body, and extend such that a thickness decreases upward from the lower end toward an inside of the upper body, and the lid coupling unit is provided to have a shape corresponding to the third coupling unit.

16. The packaging box of claim 1, wherein when a receiving groove is formed in a side of a top inner surface of the lid and a protrusion is formed upward from a side of a top of the product, the protrusion is received in the receiving groove.

17. The packaging box of claim 1, wherein when a protrusion is formed upward from a side of a top of the product, an auxiliary board is inserted between the lid and the product in order to fill a stepped space formed due to the protrusion.

18. The packaging box of claim 1, wherein each of the bottom unit, the lower body, the upper body, and the lid is formed of expanded polypropylene (EPP).

* * * * *